(12) United States Patent
Laman et al.

(10) Patent No.: US 11,774,270 B2
(45) Date of Patent: Oct. 3, 2023

(54) ENCODER

(71) Applicant: Mitutoyo Corporation, Kanagawa (JP)

(72) Inventors: Norman Laman, Kirkland, WA (US);
Joseph Daniel Tobiason, Bothell, WA (US); Shu Hirata, Kanagawa (JP);
Tatsuhiko Mukuta, Kanagawa (JP);
Akihide Kimura, Saitama (JP)

(73) Assignee: MITUTOYO CORPORATION, Kawasaki (JP)

( * ) Notice: Subject to any disclaimer, the term of this patent is extended or adjusted under 35 U.S.C. 154(b) by 164 days.

(21) Appl. No.: 17/407,761

(22) Filed: Aug. 20, 2021

(65) Prior Publication Data
US 2023/0059800 A1 Feb. 23, 2023

(51) Int. Cl.
*G01D 5/347* (2006.01)
*G01D 5/244* (2006.01)
*G01D 5/241* (2006.01)

(52) U.S. Cl.
CPC ....... *G01D 5/3473* (2013.01); *G01D 5/34715* (2013.01); *G01D 5/2415* (2013.01); *G01D 5/24414* (2013.01); *G01D 5/34794* (2021.05); *G01D 2205/85* (2021.05); *G01D 2205/90* (2021.05)

(58) Field of Classification Search
CPC ............ G01D 5/3473; G01D 5/34715; G01D 5/2415; G01D 5/24414; G01D 5/34794; G01D 2205/85; G01D 2205/90; G01D 5/24438; G01D 5/34746
See application file for complete search history.

(56) References Cited

U.S. PATENT DOCUMENTS

| | | | |
|---|---|---|---|
| 2008/0035837 A1* | 2/2008 | Hane | G01D 5/366 250/237 G |
| 2014/0151539 A1* | 6/2014 | Osamu | G01D 5/347 |
| 2019/0003860 A1 | 1/2019 | Tobiason et al. | |

FOREIGN PATENT DOCUMENTS

JP 2019-12064 1/2019

* cited by examiner

*Primary Examiner* — Tarifur R Chowdhury
*Assistant Examiner* — Alima Diawara Diawara
(74) *Attorney, Agent, or Firm* — Rankin, Hill & Clark LLP

(57) ABSTRACT

An encoder includes scale and detection head. The detection head includes light source (transmitting unit) and light-receiving unit (receiving unit). The light-receiving unit includes light-receiving surface (receiving surface) and converts light received at the light-receiving surface 50 into differential detection signals with two phases and outputs the same. The light-receiving surface includes element array group including four element arrays provided in a parallel manner along an orthogonal direction, with each element array including a plurality of light-receiving elements (receiving elements). The plurality of element arrays in the element array group are disposed at positions where the sum of: (i) a distance in the orthogonal direction from a reference position to a positive phase signal element array; and (ii) a distance in the orthogonal direction from the reference position to the negative phase signal element array, is the same for all the phases of the at least two phases.

6 Claims, 12 Drawing Sheets

ENCODER

FIELD OF THE INVENTION

The present invention relates to encoders.

BACKGROUND ART

Encoders provided with plate-like scales having graduations formed with a predetermined period along the measurement direction and detection heads provided movably relative to the scales along the measurement direction have conventionally been known. For example, the detection head of the optical encoder (encoder) in Patent Document 1 is provided with a light source (transmitting unit) that radiates light (measurement signals) toward the scale and a light-receiving unit (receiving unit) having a light-receiving surface (receiving surface) that receives the light from the light source via the scale. The light-receiving unit converts the light received at the light-receiving surface into detection signals that vary correspondingly to the period of the graduations in response to the relative movement between the scale and the detection head, and outputs such detection signals. The detection signals are differential detection signals with at least two different phases.

The light-receiving surface of the light-receiving unit includes an element array group including a plurality of element arrays provided in a parallel manner along an orthogonal direction orthogonal to the measurement direction, with each element array including a plurality of light-receiving elements (receiving elements) disposed along the measurement direction with a period corresponding to that of the graduations. In such optical encoder, the light radiated from the light source becomes a plurality of diffraction rays via the graduations. The plurality of diffraction rays generate interference fringes having the same period as that of the graduations. The light-receiving unit receives these interference fringes, and the detection head detects, from the interference fringes received by the light-receiving unit, detection signals for detecting the amount of relative movement between the scale and the detection head. The optical encoder calculates the amount of relative movement between the scale and the detection head based on the detection signals.

PRIOR ART DOCUMENTS

Patent Documents

Patent Document 1: Japanese Unexamined Patent Application Publication No. 2019-012064

SUMMARY OF THE INVENTION

Problems to be Solved by the Invention

FIG. 10 is a schematic diagram showing a light-receiving unit 9, signal input units 600a, 600b, and a calculation means 800 in a conventional encoder 100.

The light-receiving unit 9 outputs detection signals with an A-phase and a B-phase, which are two different phases. Each of the A-phase detection signal and the B-phase detection signal is a differential signal. As shown in FIG. 10, the light-receiving surface 90 of the light-receiving unit 9 is provided with an element array group 700 in which a plurality of element arrays 710-740 are provided in a parallel manner along an orthogonal direction orthogonal to the measurement direction. The plurality of element arrays 710-740 includes a first element array 710, a second element array 720, a third element array 730, and a fourth element array 740, in this order from the +Y side (the top part in the plane of the paper) to the −Y side (the bottom part in the plane of the paper).

The first element array 710 outputs an A-phase signal, which is a positive phase signal of the A-phase, the second element array 720 outputs a B-phase signal, which is a positive phase signal of the B-phase, the third element array 730 outputs an AB-phase signal, which is a negative phase signal of the A-phase, and the fourth element array 740 outputs a BB-phase signal, which is a negative phase signal of the B-phase.

Here, the positive phase signal refers to a positive phase signal of the differential detection signals for detecting the amount of relative movement. The negative phase signal refers to a negative phase detection signal that pairs up with the positive phase signal of the differential detection signals. The pairing positive phase signal and negative phase signal are a pair of signals with phases shifted by, ideally, 180 degrees. In the drawings in the following description, the A-phase signal will be denoted by "A-phase," the AB-phase signal will be denoted by "AB-phase," the B-phase signal will be denoted by "B-phase," and the BB-phase signal will be denoted by "BB-phase."

The encoder 100 is also provided with: a first signal input unit 600a and a second signal input unit 600b, into which the detection signals (i.e., a pair of a positive phase signal and a negative phase signal) output from the light-receiving unit 9 are input as differential signals; and a calculation means 800 that calculates the amount of relative movement between a scale 2 (see FIG. 11) and a detection head 300 based on the signals output from the two signal input units 600a, 600b.

Each of the two signal input units 600a, 600b is provided with a positive phase signal input unit 610a, 610b, into which a positive phase signal is input as the detection signal from the light-receiving unit 9, and a negative phase signal input unit 620a, 620b, into which a negative phase signal is input as the detection signal from the light-receiving unit 9.

For the first signal input unit 600a, the A-phase signal is input from the first element array 710 of the light-receiving unit 9 into the positive phase signal input unit 610a, and the AB-phase signal is input from the third element array 730 into the negative phase signal input unit 620a. The first signal input unit 600a then outputs a difference A-phase signal, which is the difference between the A-phase signal and the AB-phase signal (i.e., the A-phase signal minus the AB-phase signal) to the calculation means 800.

For the second signal input unit 600b, the B-phase signal is input from the second element array 720 of the light-receiving unit 9 into the positive phase signal input unit 610b, and the BB-phase signal is input from the fourth element array 740 into the negative phase signal input unit 620b. The second signal input unit 600b then outputs a difference B-phase signal, which is the difference between the B-phase signal and the BB-phase signal (i.e., the B-phase signal minus the BB-phase signal) to the calculation means 800. In FIG. 10, regarding input into the two signal input units 600a, 600b from the plurality of element arrays 710-740, the positive phase signals are indicated with solid lines and the negative phase signals are indicated with dashed lines.

FIG. 11 is a top view showing the state in which the scale 2 is disposed at a tilt angle θ=0 with respect to the light-receiving unit 9 in the conventional encoder 100. FIG. 12 is a top view showing the state in which the scale 2 is disposed at a tilt angle θ≠0 with respect to the light-receiving unit 9 in the conventional encoder 100. More specifically, FIGS. 11 and 12 are top views in which the light-receiving unit 9 is seen from the scale 2 side.

As shown in FIG. 11, in the encoder 100, the scale 2 is preferably disposed at a tilt angle θ=0 with respect to the light-receiving unit 9 without the scale 2 being disposed in a tilted manner by being rotated around an axis (i.e., a rotation axis) orthogonal to the light-receiving surface 90. At this time, problems regarding the tilted interference fringes and/or the amount of shift of the detection signals, which will be described hereinafter, will not arise in the encoder 100.

However, as shown in FIG. 12, the scale 2 may be disposed at a tilt angle θ≠0 with respect to the light-receiving unit 9 by being rotated around the rotation axis orthogonal to the light-receiving surface 90 during a manufacturing process, such as assembly. In such case, the following effects occur.

If the scale is disposed in a tilted manner at a tilt angle θ≠0 with respect to the light-receiving unit 9, in particular, with respect to the direction (Y direction) orthogonal to the measurement direction, by being rotated around the rotation axis orthogonal to the light-receiving surface, the interference fringes, which are generated in the light-receiving surface 90 of the light-receiving unit 9, are also generated at the tilt angle θ≠0 in accordance with the rotation of the scale. When the light-receiving unit 9 receives the interference fringes at the tilt angle θ≠0, the phases of the detection signals input into the signal input units 600a, 600b from the plurality of element arrays 710-740 provided in a parallel manner in the Y direction are also shifted in accordance with the rotation of the tilt angle θ≠0. The amount of phase shift of the detection signals detected at light-receiving elements (not shown) varies due to the difference in position in the Y direction in the respective element arrays 710-740. Consequently, the two signals based on the detection signals input to the two signal input units 600a, 600b will also shift, and the calculation result (the amount of relative movement) will be affected.

FIG. 13 is a graph showing variations of the differential signals based on the two phases in the conventional encoder 100. More specifically, in FIG. 13, the vertical axis represents the output voltage of the two signal input units 600a, 600b and the horizontal axis represents the relative displacement of the detection head 300 with respect to the scale 2. FIG. 14 is a graph showing Lissajous signals calculated from the differential signals based on the two phases in the conventional encoder 100. More specifically, in FIG. 14, the vertical axis represents the difference B-phase signal, and the horizontal axis represents the difference A-phase signal. In FIGS. 13 and 14, the graph when the scale is disposed at the tilt angle θ≠0 with respect to the light-receiving unit 9 is indicated with solid lines and the graph when the scale is disposed at the tilt angle θ=0 with respect to the light-receiving unit 9 is indicated with dashed lines.

If the scale is disposed at the tilt angle θ≠0 with respect to the light-receiving unit 9, as shown in FIG. 13, when compared to the variations, indicated with dashed lines, in the case where the scale 2 is disposed at the tilt angle θ=0 (see FIG. 11), the variations are shifted in the direction of an arrow pointing toward the south-east in the plane of the paper and in the direction of an arrow pointing toward the north-west in the plane of the paper, and the output voltage is reduced. In addition, as shown in FIG. 14, the Lissajous signal is smaller compared to the Lissajous signal, indicated with a dashed line, in the case where the scale 2 is disposed at the tilt angle θ=0, and its shape becomes elliptic. The calculation means 800 performs calculation based on this deformed Lissajous signal and outputs the amount of relative movement as the calculation result. Accordingly, there is a problem in that the accuracy of the encoder 100 deteriorates if the scale is disposed in a tilted manner at a tilt angle θ≠0 with respect to the light-receiving unit 9.

An object of the present invention is to provide an encoder capable of suppressing the accuracy deterioration even if the scale is disposed in a tilted manner with respect to the receiving unit by being rotated around an axis (i.e., a rotation axis) orthogonal to the receiving surface.

Means for Solving the Problem

The encoder of the present invention includes: a plate-like scale having graduations formed with a predetermined period along a measurement direction; and a detection head provided movably relative to the scale along the measurement direction. The detection head includes: a transmitting unit that transmits measurement signals toward the scale; and a receiving unit that includes a receiving surface that receives the measurement signals from the transmitting unit via the scale. The receiving unit converts the measurement signals received at the receiving surface into differential detection signals with at least two different phases and outputs the detection signals. The detection signals vary correspondingly to the period of the graduations in response to the relative movement between the scale and the detection head. The receiving surface includes: an element array group including a plurality of element arrays provided in a parallel manner along an orthogonal direction orthogonal to the measurement direction. The plurality of element arrays includes at least four element arrays. Each element array includes a plurality of receiving elements disposed along the measurement direction with a period corresponding to that of the graduations. The plurality of element arrays includes, for each of the at least two phases: a positive phase signal element array that outputs a positive phase signal; and a negative phase signal element array that outputs a negative phase signal. The at least two phases are disposed in a shifted manner with a predetermined phase difference along the measurement direction. The plurality of element arrays in the element array group are disposed at positions where the sum of: (i) a distance in the orthogonal direction from a reference position to a positive phase signal element array; and (ii) a distance in the orthogonal direction from the reference position to a negative phase signal element array, is the same for all the phases of the at least two phases. The reference position refers to a predetermined position on the receiving surface.

According to such invention, the plurality of element arrays in the element array group are disposed at positions where the sum of: (i) a distance in the orthogonal direction from a reference position to a positive phase signal element array; and (ii) a distance in the orthogonal direction from the reference position to a negative phase signal element array, is the same for all the phases of the at least two phases. This enables the shift in the phase difference between the differential signals caused by the scale being disposed in a tilted manner with respect to the receiving unit by being rotated around an axis (i.e., a rotation axis) orthogonal to the receiving surface to be canceled out. Accordingly, the encoder can suppress the accuracy deterioration even when the scale is disposed in a tilted manner with respect to the receiving unit by being rotated around the axis (i.e., the rotation axis) orthogonal to the receiving surface.

In such case, the positive phase signal element arrays preferably account for half of the plurality of element arrays in the element array group and are disposed on one side of the receiving surface with respect to the center line, which runs in the measurement direction at the center of the plurality of element arrays provided in a parallel manner in the orthogonal direction. Further, the negative phase signal element arrays preferably account for half of the plurality of element arrays in the element array group and are disposed on the other side of the receiving surface with respect to the center line, which runs in the measurement direction at the center of the plurality of element arrays provided in a parallel manner in the orthogonal direction.

According to such configuration, the positive phase signal element arrays are disposed on one side in the receiving surface with respect to the center line at the center of the element arrays provided in a parallel manner in the orthogonal direction and the negative phase signal element arrays are disposed on the other side in the receiving surface with respect to the center line at the center of the element arrays provided in a parallel manner in the orthogonal direction. This enables the design to be simplified as well as enabling the reduction in amplitude of the differential signals to be suppressed.

In such case, the element array group preferably includes: a first element array group; and a second element array group. The second element array group is adjacent to and provided in a parallel manner to the first element array group in the orthogonal direction in the receiving surface, and the second element array group includes the plurality of element arrays that are disposed differently from the plurality of element arrays in the first element array group. Preferably, the positive phase signal element arrays in the first element array group account for half of the plurality of element arrays in the first element array group, are disposed on one side with respect to the center line, which runs in the measurement direction at the center of the plurality of element arrays provided in a parallel manner in the orthogonal direction in the first element array group, and are disposed in the order serving as a predetermined reference from one end in the orthogonal direction toward the center in the first element array group. Here, the "order serving as a predetermined reference" may be defined, for example, as the order of an A-phase and then a B-phase if the two phases consist of an A-phase and a B-phase. Preferably, the negative phase signal element arrays in the first element array group account for half of the plurality of element arrays in the first element array group, are disposed on the other side with respect to the center line, which runs in the measurement direction at the center of the plurality of element arrays provided in a parallel manner in the orthogonal direction in the first element array group, and are disposed in the order serving as a predetermined reference from the other end in the orthogonal direction toward the center in the first element array group. Preferably, the positive phase signal element arrays in the second element array group account for half of the plurality of element arrays in the second element array group, are disposed on one side with respect to the center line, which runs in the measurement direction at the center of the plurality of element arrays provided in a parallel manner in the orthogonal direction in the second element array group, and are disposed in the order reverse to the order serving as the predetermined reference (in the above-described example, in the order of a B-phase and then an A-phase) from one end in the orthogonal direction toward the center in the second element array group. Preferably, the negative phase signal element arrays of the second element array group account for half of the plurality of element arrays in the second element array group, are disposed on the other side with respect to the center line, which runs in the measurement direction at the center of the plurality of element arrays provided in a parallel manner in the orthogonal direction in the second element array group, and are disposed in the order reverse to the order serving as the predetermined reference from the other end in the orthogonal direction toward the center line in the second element array group.

According to such configuration, while suppressing the reduction in amplitude of the differential signals, which are based on the detection signals from the receiving unit, the shift in the phase difference between the differential signals caused by the scale being disposed in a tilted manner with respect to the receiving unit by being rotated around an axis (i.e., a rotation axis) orthogonal to the receiving surface can be canceled out more efficiently than the case where the first element array group and the second element array group are not provided.

In such case, preferably, a plurality of the element array groups are disposed along the orthogonal direction in the receiving surface.

Such configuration enables the distribution of the measurement signals that are transmitted onto the receiving surface via the scale to become uniform. For example, if the encoder is of an optical type and the transmitting unit is a light source, the light distribution of the light radiated onto the light-receiving surface via the scale can be made uniform.

In such case, the detection head includes: a light source serving as a transmitting unit that radiates light serving as measurement signals toward the scale; and a light-receiving unit serving as a receiving unit that includes a light-receiving surface serving as a receiving surface that receives the light from the light source via the scale. The light-receiving unit converts the light received at the light-receiving surface into differential detection signals with at least two different phases and outputs the detection signals. The detection signals vary correspondingly to the period of the graduations in response to the relative movement between the scale and the detection head. Preferably, the light-receiving surface includes: an element array group including a plurality of element arrays provided in a parallel manner along an orthogonal direction orthogonal to the measurement direction. The plurality of element arrays including at least four element arrays. Each element array including a plurality of light-receiving elements serving as receiving elements disposed along the measurement direction with a period corresponding to that of the graduations.

If the encoder is an optical encoder, such configuration enables the accuracy deterioration of the encoder to be suppressed even if the scale is disposed in a tilted manner with respect to the receiving unit (light-receiving unit) by being rotated around an axis (i.e., a rotation axis) orthogonal to the receiving surface (light-receiving surface).

In such case, the encoder preferably includes a plate-like grid plate having a plurality of grids formed along the measurement direction with a period corresponding to that of the graduations. The grid plate is preferably disposed between the scale and the light-receiving unit. The light-receiving unit preferably receives light that has passed through the grid plate.

For example, even if light-receiving elements with a size larger than a desired size can only be used, such configuration enables interference fringes almost similar to those generated by the light-receiving elements with the desired size to be generated by disposing the grid plate over the light-receiving elements.

EMBODIMENTS OF THE INVENTION

First Embodiment

The first embodiment of the present invention will be described hereinafter with reference to FIGS. 1 to 5.

Figure 1:
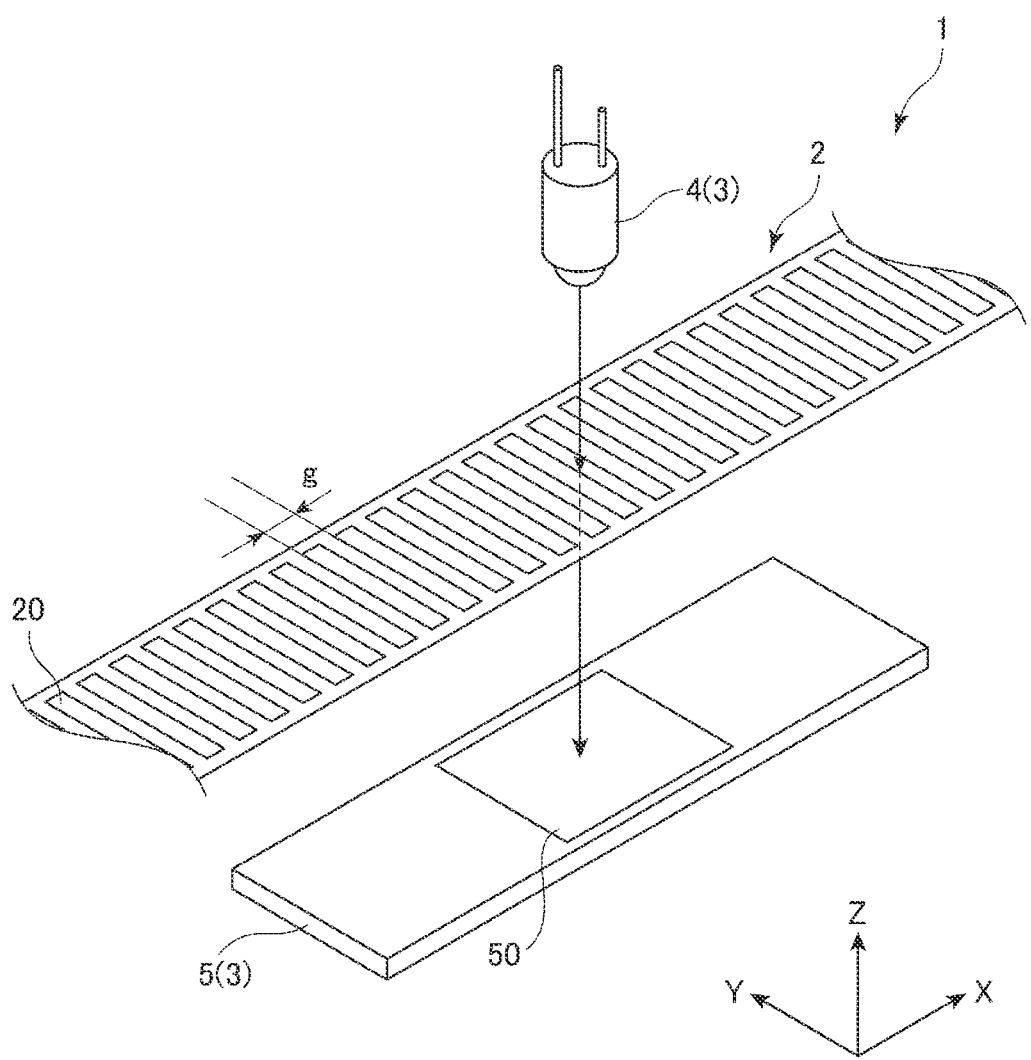
FIG. 1 is a perspective view showing an encoder according to a first embodiment.

FIG. 1 is a perspective view showing an encoder 1 according to the first embodiment.

As shown in FIG. 1, the encoder 1 is an optical linear encoder provided with a plate-like scale 2 formed along the X direction, which is the measurement direction, and a detection head 3 provided movably relative to the scale 2 along the X direction. In the following description and the respective drawings, the measurement direction, i.e., the longitudinal direction of the scale 2 will be referred to as the X direction, the lateral direction of the scale 2 will be referred to as the Y direction, and the height direction orthogonal to the X direction and the Y direction will be referred to as the Z direction.

The detection head 3 is provided with a transmitting unit 4 that transmits measurement signals toward the scale 2 and a receiving unit 5 that converts the received measurement signals into detection signals and outputs the same. In the present embodiment, a light source 4 serving as the transmitting unit 4 radiates light serving as the measurement signals toward the scale 2, and a light-receiving unit 5 serving as the receiving unit 5 converts the received light into the detection signals and outputs the same. The detection head 3 is provided integrally with the light source 4 and the light-receiving unit 5 and can move forward or backward in the X direction with respect to the scale 2. The linear encoder acquires position information from the amount of relative movement between the scale 2 and the detection head 3 by moving the detection head 3 along the scale 2.

The scale 2 is formed into a plate shape with materials, such as glass. One side of the scale 2 is provided with graduations 20, which are formed with a predetermined period g along the X direction. The graduations 20 are specifically grid-like holes formed in the scale 2. Instead of the grid-like holes, the graduations 20 may also be formed, for example, by applying materials, such as a non-light-transparent film formed into a grid shape, to the scale plate.

The light source 4 radiates parallel light over the scale 2. A light-emitting diode (LED) is used for the light source 4. The light source 4 is, however, not limited to the LED and any light source, such as a semiconductor laser, a helium-neon laser, may be employed as long as it can cause interference fringes to be generated in the light-receiving unit 5. The light path of the light radiated from the light source 4 is shown with an arrow in FIG. 1.

The light-receiving unit 5 is disposed parallel to the XY plane, which corresponds to the plate plane of the scale 2. The light-receiving unit 5 includes a light-receiving surface 50 serving as a surface for receiving the light from the light source 4 through the scale 2.

The light-receiving unit 5 receives the light that has passed through the scale 2 and detects detection signals from interference fringes generated by the light. In the present embodiment, the interference fringes are generated at the light-receiving surface 50 on the light-receiving unit 5 along the Y direction, which is the lateral direction of the scale 2. A photo-diode array (PDA) is used for the light-receiving unit 5. The PDA is a detector with a property that allows a plurality of interference fringes to be measured at one time. The light-receiving unit 5 is, however, not limited to the PDA and any detector, such as a charge-coupled device (CCD), may be used.

Figure 2:
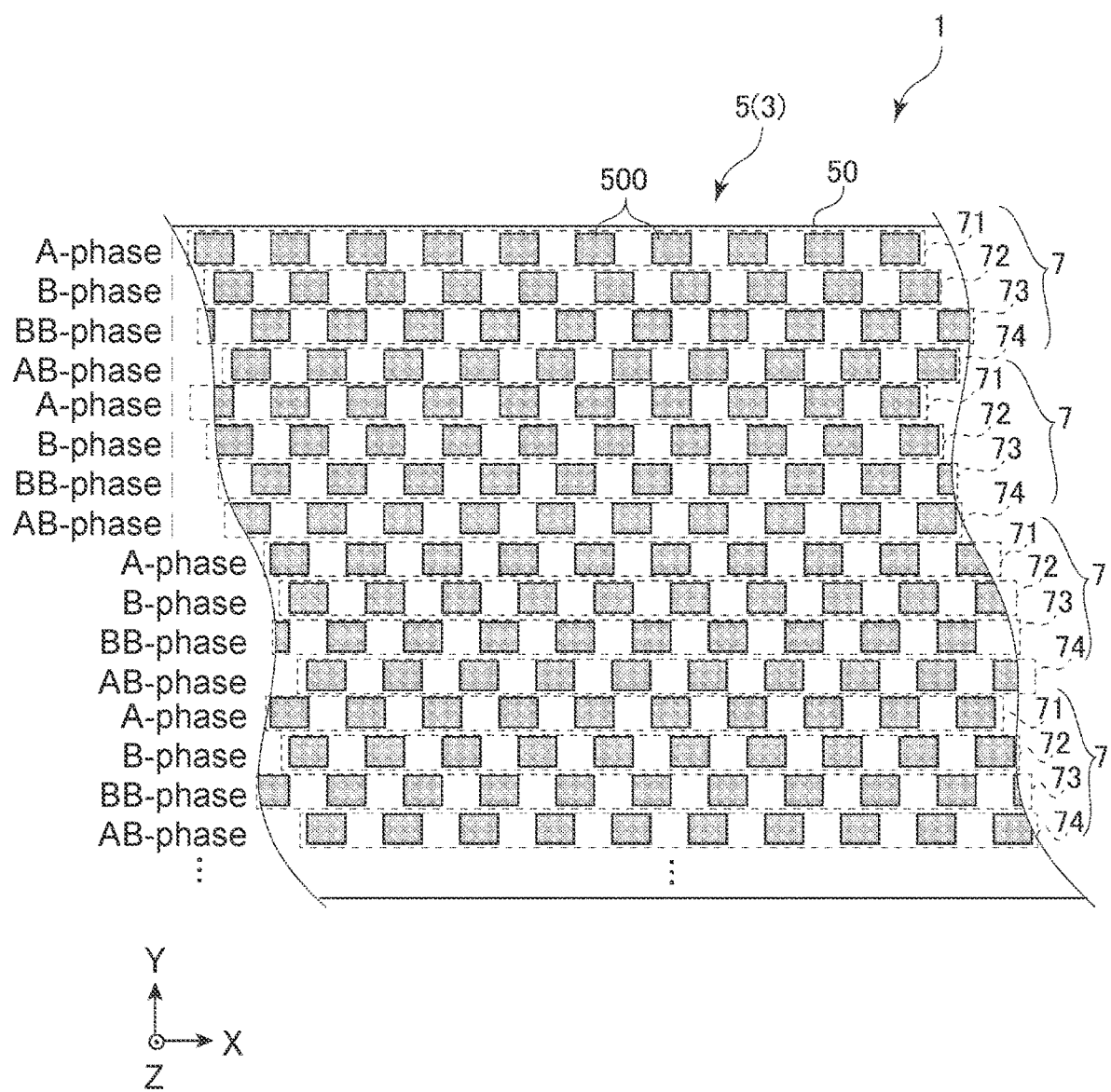
FIG. 2 is a plan view showing a light-receiving unit in the above-described encoder.

FIG. 2 is a plan view showing the light-receiving unit 5 in the encoder 1.

The light-receiving unit 5 will be described in detail hereinafter.

Based on the light received at the light-receiving surface 50, the light-receiving unit 5 outputs detection signals that vary correspondingly to the period of the graduations 20 (see FIG. 1) in response to the relative movement between the scale 2 (see FIG. 1) and the detection head 3. The detection signals include detection signals with two different phases (i.e., an A-phase and a B-phase). The detection signal of each phase is a differential signal. In the present embodiment, the detection signals include an A-phase signal, which is a positive phase signal of the A-phase, an AB-phase signal, which is a negative phase signal of the A-phase, a B-phase signal, which is a positive phase signal of the B-phase, and a BB-phase signal, which is a negative phase signal of the B-phase.

As shown in FIG. 2, the light-receiving surface 50 includes a plurality of element arrays 71-74. Each element array 71-74 is provided with a plurality of light-receiving elements 500 serving as a plurality of receiving elements disposed along the measurement direction (X direction) with a period corresponding to that of the graduations 20. The plurality of element arrays 71-74 are provided in a parallel manner along the direction (Y direction) orthogonal to the measurement direction.

The light-receiving surface 50 is also provided with an element array group 7 grouping four arrays, i.e., the element arrays 71-74, into a single group. An element array group 7 includes at least four element arrays 71-74, and any even number of element arrays 71-74. A plurality of element array groups 7 are disposed along the Y direction in the light-receiving surface 50.

Figure 3:
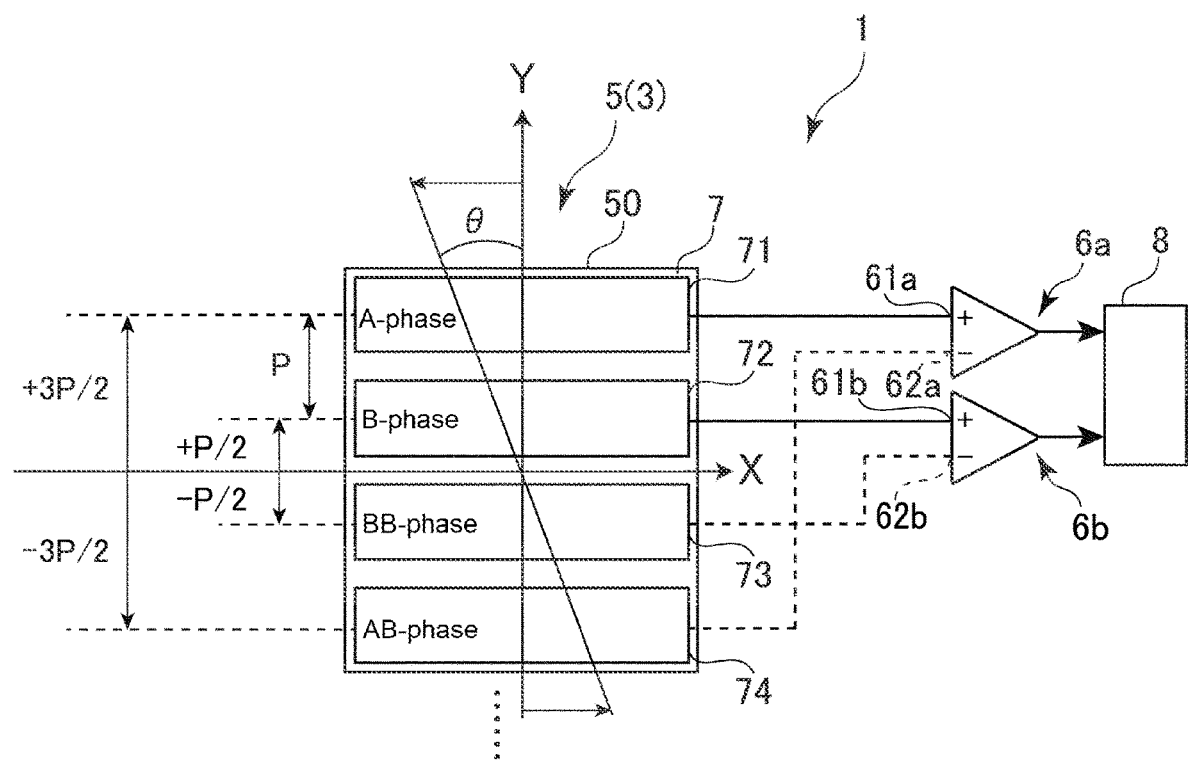
FIG. 3 is a schematic diagram showing the light-receiving unit, signal input units, and a calculation means in the above-described encoder.
Figure 3:
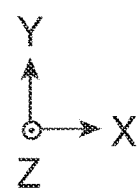

FIG. 3 is a schematic diagram showing the light-receiving unit 5, signal input units 6a, 6b, and a calculation means 8 in the encoder 1.

As shown in FIG. 3, the element array group 7 includes a first element array 71, a second element array 72, a third element array 73, and a fourth element array 74, in this order from the +Y side (the top part in the plane of the paper) to the −Y side (the bottom part in the plane of the paper). The plurality of element arrays 71-74 are disposed with a pre-determined pitch P along the Y direction. For each of the two phases, the plurality of element arrays 71-74 include positive phase signal element arrays (the first element array 71 and the second element array 72) that output positive phase signals, and negative phase signal element arrays (the third element array 73 and the fourth element array 74) that output negative phase signals.

The first element array 71 outputs an A-phase signal, which is a positive phase signal of the A-phase, the second element array 72 outputs a B-phase signal, which is a positive phase signal of the B-phase, the third element array 73 outputs a BB-phase signal, which is a negative phase signal of the B-phase, and the fourth element array 74 outputs an AB-phase signal, which is a negative phase signal of the B-phase. Accordingly, the first element array 71 and the second element array 72 correspond to the positive phase signal element arrays in the present invention, and the third element array 73 and the fourth element array 74 correspond to the negative phase signal element arrays in the present invention.

Further, the plurality of element arrays 71-74 are disposed in a shifted manner along the X direction with a predetermined phase difference. More specifically, when the A-phase signal is taken as a reference, the B-phase signal is disposed with a phase difference of 90 degrees, the AB-phase signal is disposed with a phase difference of 180 degrees, and the BB-phase signal is disposed with a phase difference of 270 degrees. Accordingly, the second element array 72 is disposed in a shifted manner along the X direction with a phase difference of 90 degrees relative to the first element array 71, the third element array 73 is disposed in a shifted manner along the X direction with a phase difference of 270 degrees relative to the first element array 71, and the fourth element array 74 is disposed in a shifted manner along the X direction with a phase difference of 180 degrees relative to the first element array 71.

The first element array 71 and the second element array 72, which are the positive phase signal element arrays, account for half (i.e., two arrays) of the plurality of (i.e., four) element arrays 71-74 in the element array group 7. The first element array 71 and the second element array 72 are disposed on one side (i.e., the +Y side) of the light-receiving surface 50 with respect to the center line, which runs in the X direction at the center of the element arrays provided in a parallel manner in the Y direction. The center line is indicated as the X-axis in FIG. 3. The third element array 73 and the fourth element array 74, which are the negative phase signal element arrays, account for half (i.e., two arrays) of the plurality of (i.e., four) element arrays 71-74 in the element array group 7. The third element array 73 and the fourth element array 74 are disposed on the other side (i.e., the −Y side) of the light-receiving surface 50 with respect to the center line.

The encoder 1 is also provided with: a first signal input unit 6a and a second signal input unit 6b, into which the detection signals output from the light-receiving unit 5 are input as differential signals; and a calculation means 8 that calculates the amount of relative movement between the scale (see FIG. 1) and the detection head 3 based on the differential signals output from the two signal input units 6a, 6b.

Each of the two signal input units 6a, 6b is provided with a positive phase signal input unit 61a, 61b, into which a positive phase signal is input as the detection signal from the light-receiving unit 5 and a negative phase signal input unit 62a, 62b, into which a negative phase signal is input as the detection signal from the light-receiving unit 5.

For the first signal input unit 6a, the A-phase signal is input from the first element array 71 of the light-receiving unit 5 into the positive phase signal input unit 61a, and the AB-phase signal is input from the fourth element array 74 into the negative phase signal input unit 62a. The first signal input unit 6a then outputs a difference A-phase signal, which is the difference between the A-phase signal and the AB-phase signal (i.e., the A-phase signal minus the AB-phase signal) to the calculation means 8.

For the second signal input unit 6b, the B-phase signal is input from the second element array 72 of the light-receiving unit 5 into the positive phase signal input unit 61b, and the BB-phase signal is input from the third element array 73 into the negative phase signal input unit 62b. The second signal input unit 6b then outputs a difference B-phase signal, which is the difference between the B-phase signal and the BB-phase signal (i.e., the B-phase signal minus the BB-phase signal) to the calculation means 8. In the figures in the following description, regarding input into the two signal input units 6a, 6b from the plurality of element arrays 71-74, the positive phase signals are indicated with solid lines and the negative phase signals are indicated with dashed lines.

Figure 11:
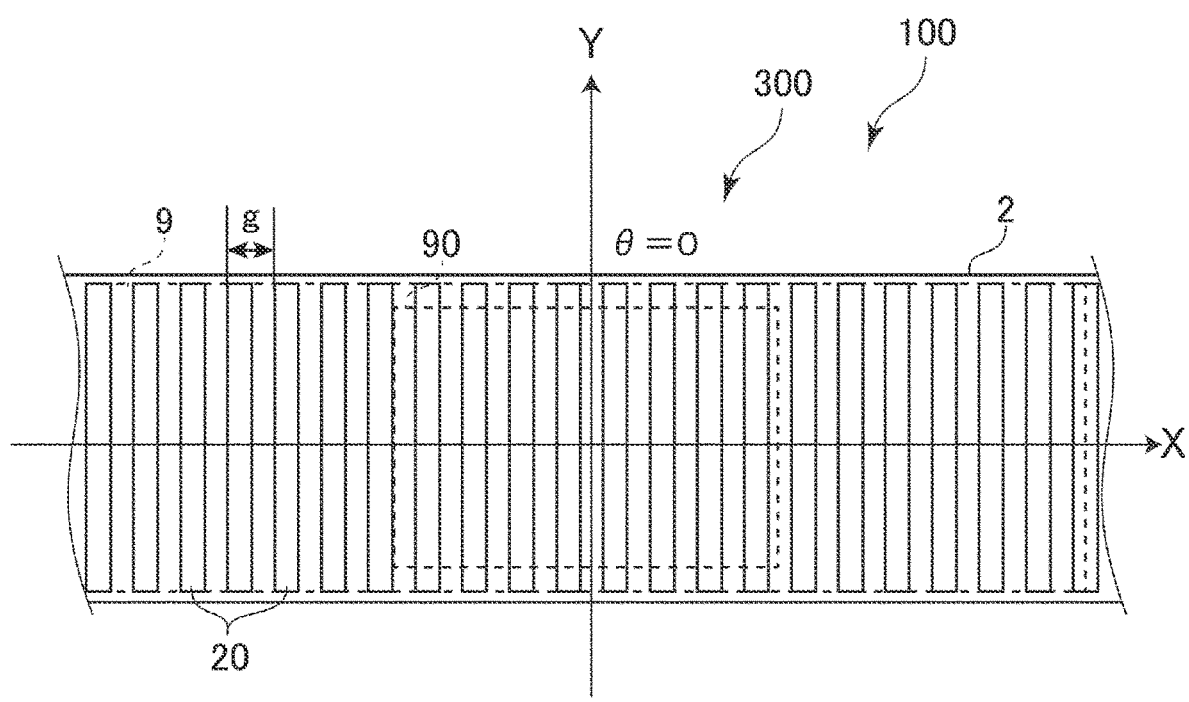
FIG. 11 is a top view showing the state in which the scale is disposed at a tilt angle θ=0 with respect to the light-receiving unit in the conventional encoder.

Now, as described above, in the encoder 1, the scale 2 is preferably disposed at a tilt angle θ=0 with respect to the light-receiving unit 5 (see FIG. 11). This is because, when the scale 2 is disposed at a tilt angle θ=0, ideal interference fringes can be generated on the light-receiving surface 50 when a measurement is conducted, and stable measurement results can be obtained. However, even if the scale 2 is disposed at a tilt angle θ≠0 with respect to the light-receiving unit 5 (see FIG. 12), it is possible to make the encoder 1 less affected by such condition. Hereinafter, the principle will be described by which, even if the scale 2 is disposed at a tilt angle θ≠0 with respect to the light-receiving unit 5, it is possible to make the encoder 1 less affected by such condition by means of the configuration of the light-receiving unit 5.

The plurality of element arrays 71-74 in the element array group 7 are disposed at positions where the sum of: (i) the distance in the +Y direction from a reference position to a positive phase signal element array (the first element array 71 or the second element array 72); and (ii) the distance in the −Y direction from the reference position to a negative phase signal element array (the third element array 73 or the fourth element array 74), is the same for all the phases.

Here, the reference position refers to a predetermined position on the light-receiving surface 50 and in the present embodiment, the description will be provided by taking the X-axis in the figures as the reference position.

The first element array 71 is located at a distance of +3 P/2 from the reference position in the +Y direction, the second element array 72 is located at a distance of +P/2 from the reference position in the +Y direction, the third element array 73 is located at a distance of −P/2 from the reference position in the −Y direction, and the fourth element array 74 is located at a distance of −3 P/2 from the reference position in the −Y direction.

Figure 10:
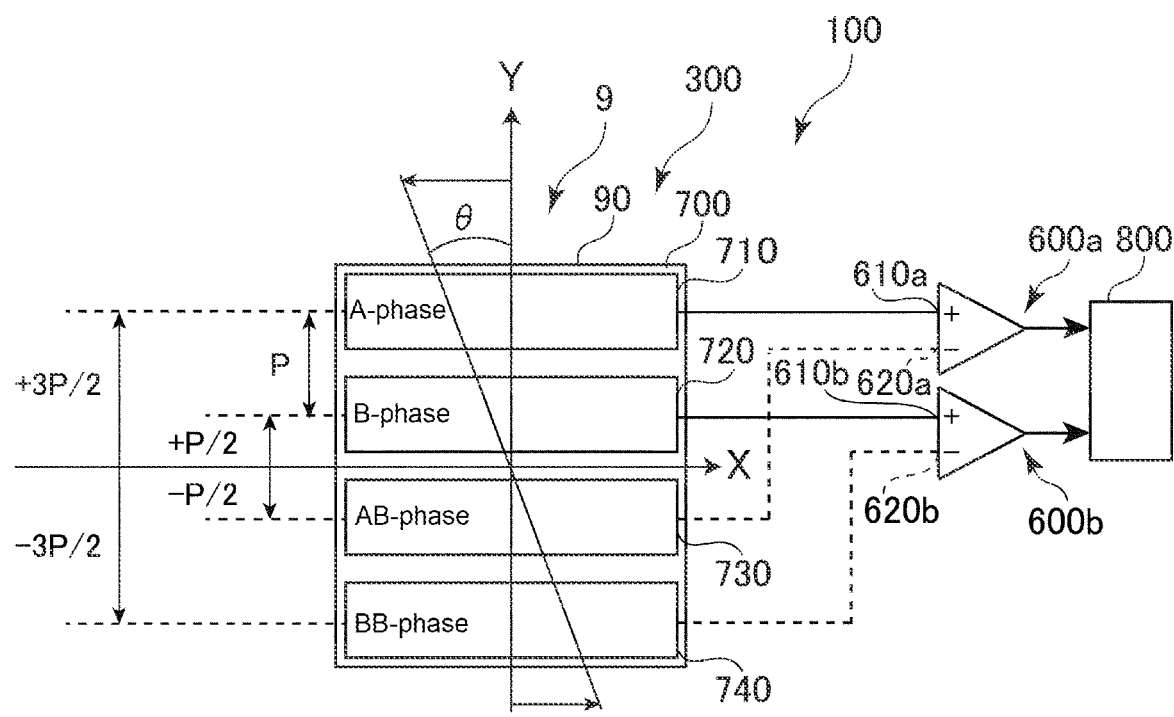
FIG. 10 is a schematic diagram showing a light-receiving unit, signal input units and a calculation means in a conventional encoder.

Similarly, also in the conventional encoder 100 shown in FIG. 10, the first element array 710 is located at a distance of +3 P/2 from the reference position in the +Y direction, the second element array 720 is located at a distance of +P/2 from the reference position in the +Y direction, the third element array 730 is located at a distance of −P/2 from the reference position in the −Y direction, and the fourth element array 740 is located at a distance of −3 P/2 from the reference position in the −Y direction.

The sum of the distances between: (i) the first element array 710, which outputs the A-phase signal, and the reference position; and (ii) the third element array 730, which outputs the AB-phase signal, and the reference position, is expressed as in the following equation (1). The A-phase signal and the AB-phase signal serve as inputs for generating the difference A-phase signal. The sum of the distances between: (i) the second element array 720, which outputs the B-phase signal, and the reference position; and (ii) the fourth element array 740, which outputs the BB-phase signal, and the reference position, is expressed as in the following equation (2). The B-phase signal and the BB-phase signals serve as inputs for generating the difference B-phase signal.

$$(+3P/2)+(-P/2)=+P \quad (1)$$

$$(+P/2)+(-3P/2)=-P \quad (2)$$

As indicated by the equations (1) and (2), in the conventional encoder 100, the element arrays are disposed at positions where the sum of (i) the distance in the +Y direction from the reference position to a positive phase signal elements array (the first element array 710 or the second element array 720), and (ii) the distance in the −Y direction from the reference position to a negative phase signal element array (the third element array 730 or the fourth element array 740), is different for the difference A-phase signal and the difference B-phase signal.

In contrast, in the encoder 1 shown in FIG. 3, the sum of the distances between: (i) the first element array 71, which outputs the A-phase signal, and the reference position; and (ii) the fourth element array 74, which outputs the AB-phase signal, and the reference position, is expressed as in the following equation (3). The A-phase signal and the AB-phase signal serve as inputs for generating the difference A-phase signal. The sum of the distances between: (i) the second element array 72, which outputs the B-phase signal, and the reference position; and (ii) the third element array 73, which outputs the BB-phase signal, and the reference position, is expressed as in the following equation (4). The B-phase signal and the BB-phase signals serve as inputs for generating the difference B-phase signal.

$$(+3P/2)+(-3P/2)=0 \quad (3)$$

$$(+P/2)+(-P/2)=0 \quad (4)$$

As indicated by the equations (3) and (4), in the encoder 1, the element arrays are disposed at positions where the sum of (i) the distance in the +Y direction from the reference position to a positive phase signal elements array (the first element array 71 or the second element array 72), and (ii) the distance in the −Y direction from the reference position to a negative phase signal element array (the third element array 73 or the fourth element array 74), is the same for the difference A-phase signal and the difference B-phase signal. Such disposition of the plurality of element arrays 71-74 allows the following effects to be obtained if the scale 2 (see FIG. 1) is disposed in a tilted manner at a tilt angle $\theta \neq 0$ with respect to the light-receiving unit 5, in particular, with respect to the direction (Y direction) orthogonal to the measurement direction (X direction), by being rotated around an axis (i.e., a rotation axis) orthogonal to the light-receiving surface 50.

Figure 12:
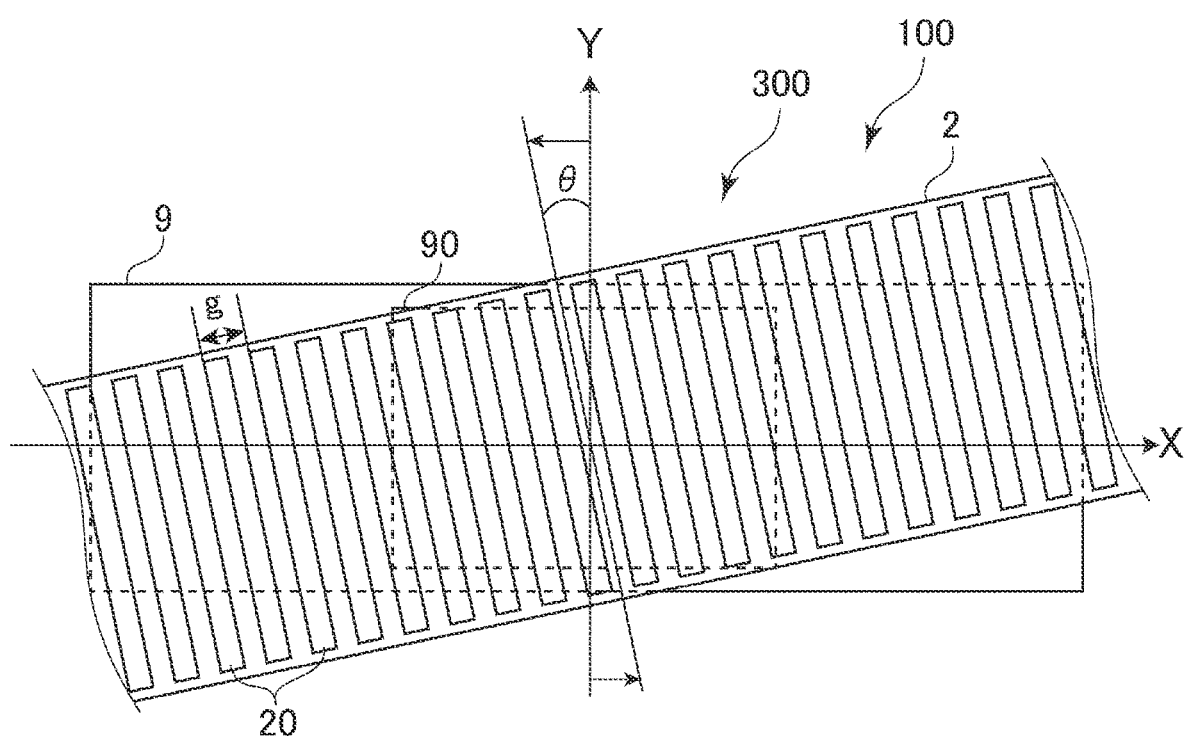
FIG. 12 is a top view showing the state in which the scale is disposed at a tilt angle θ≠0 with respect to the light-receiving unit in the conventional encoder.
Figure 13:
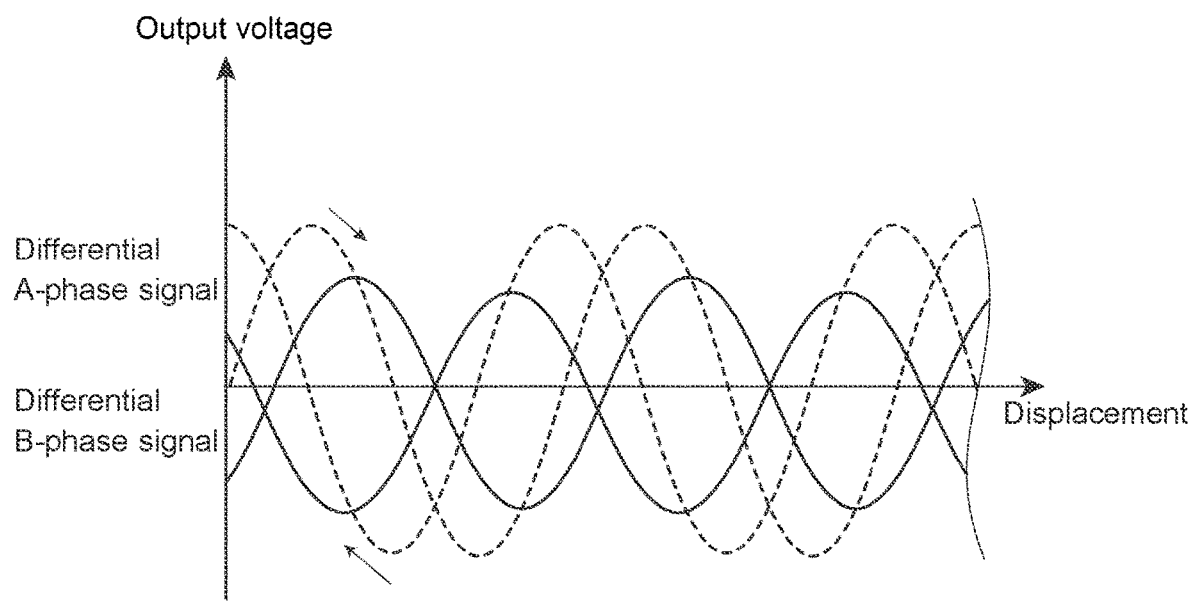
FIG. 13 is a graph showing variations of differential signals based on two phases in the conventional encoder.

If the scale 2 is disposed in a tilted manner at a tilt angle $\theta$ in the conventional encoder 100 as shown in FIG. 12, interference fringes including the phase difference resulting from the tilt angle $\theta$ of the scale are generated as indicated by equation (5) relating to the difference A-phase signal and equation (6) relating to the difference B-phase signal. When the light-receiving unit 9 receives these interference fringes, there is also a shift in the phases of the detection signals that are input into the signal input units 600a, 600b from the plurality of element arrays 710-740 provided in a parallel manner in the Y direction. The amount of phase shift of the detection signals detected at the light-receiving elements in the respective element arrays 710-740 varies depending on the difference in their positions in the Y direction. Therefore, the two differential signals are also shifted, and the calculation result (the amount of relative movement) is affected.

$$(-3P/2 \times \theta)+(P/2 \times \theta)=-P \cdot \theta \quad (5)$$

$$(-P/2 \times \theta)+(3P/2 \times \theta)=+P \cdot \theta \quad (6)$$

In contrast, as shown in FIG. 3, even if the scale 2 (see FIG. 1) is disposed in a tilted manner at a tilt angle $\theta$ in the encoder 1, the amount of shift of the two differential signals resulting from the tilt angle $\theta$ of the scale 2 is cancelled out as indicated by equation (7) relating to the difference A-phase signal and equation (8) relating to the difference B-phase signal.

$$(-3P/2 \times \theta)+(3P/2 \times \theta)=0 \quad (7)$$

$$(-P/2 \times \theta)+(P/2 \times \theta)=0 \quad (8)$$

Figure 4:
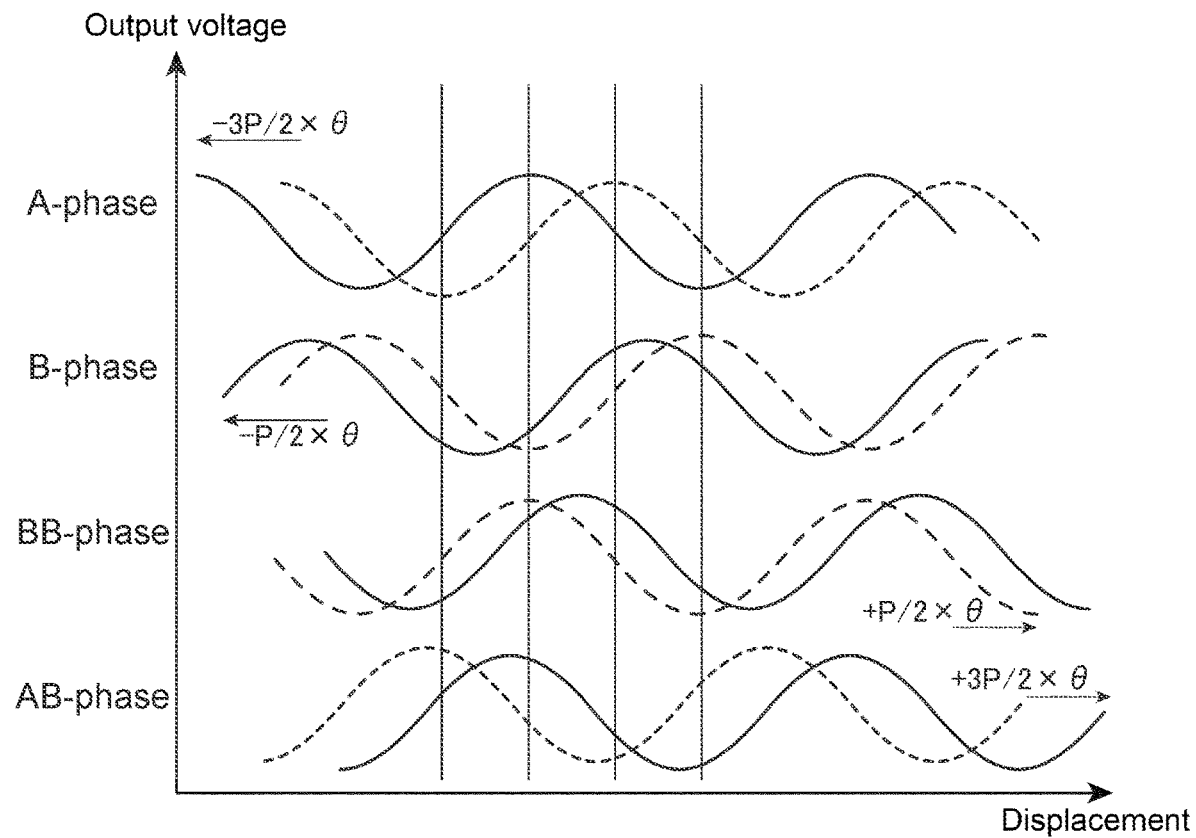
FIG. 4 is a graph showing variations of detection signals in the above-described encoder.
Figure 5:
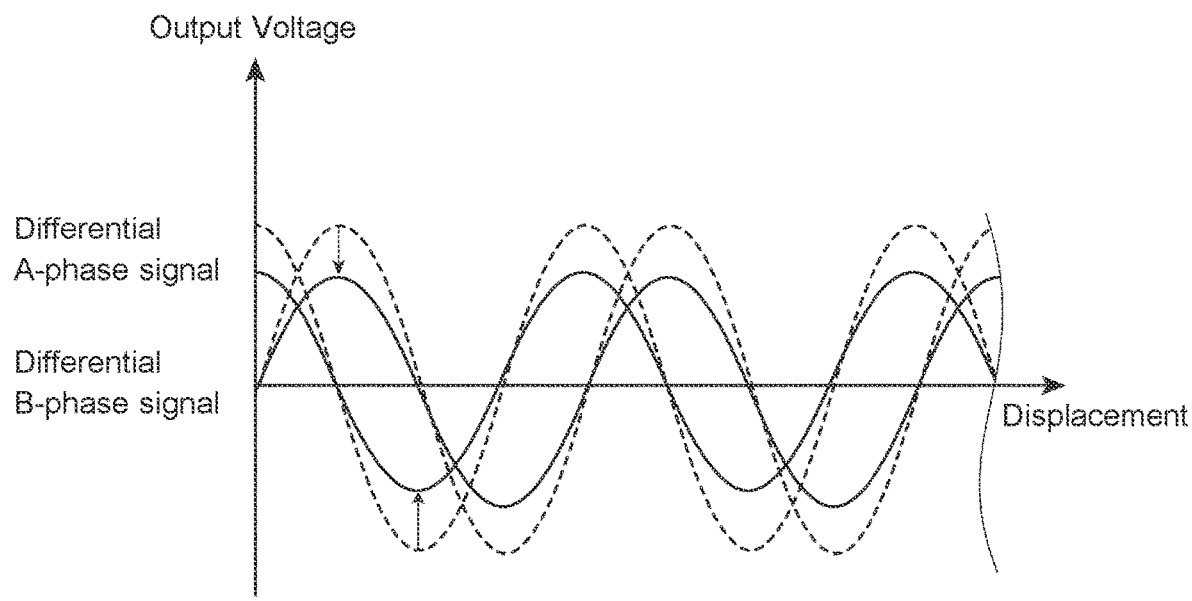
FIG. 5 is a graph showing variations of differential signals based on two phases in the above-described encoder.
Figure 6:
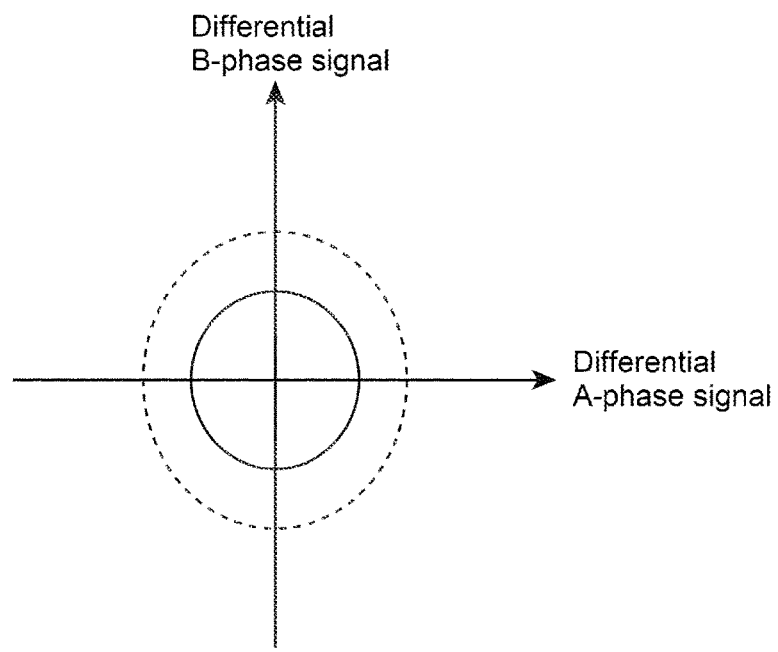
FIG. 6 is a graph showing Lissajous signals calculated from the differential signals based on the two phases in the above-described encoder.

FIG. 4 is a graph showing variations of the detection signals in the encoder 1. More specifically, in FIG. 4, the vertical axis represents the output voltage, and the horizontal axis represents the displacement. FIG. 5 is a graph showing variations of the differential signals based on the two phases in the encoder 1. More specifically, in FIG. 5, the vertical axis represents the output voltage of the two signal input units 6a, 6b, and the horizontal axis represents the relative displacement of the detection head 3 with respect to the scale 2. FIG. 6 is a graph showing Lissajous signals calculated from the differential signals based on the two phases in the encoder 1. More specifically, in FIG. 6, the vertical axis represents the difference B-phase signal, and the horizontal axis represents the difference A-phase signal. In FIGS. 4, 5, and 6, the graphs when the scale 2 (see FIG. 1) is disposed at a tilt angle $\theta \neq 0$ with respect to the light-receiving unit 5 are indicated with solid lines, and the graphs when the scale 2 is disposed at a tilt angle $\theta=0$ with respect to the light-receiving unit 5 are indicated with dashed lines.

Hereinafter, the variations of the detection signals output from the light-receiving unit 5 to the signal input units 6a, 6b and the variations of the difference A-phase signal and the difference B-phase signal output from the signal input units 6a, 6b to the calculation means 8 will be described.

As shown in FIG. 4, if the scale 2 (see FIG. 1) is disposed at a tilt angle θ≠0 with respect to the light-receiving unit 5, the phase of the A-phase signal input from the first element array 71 is shifted by −3 P/2×θ as compared to that of the case where the scale 2 is disposed at a tilt angle θ=0. The phase of the B-phase signal input from the second element array 72 is shifted by −P/2×θ. The phase of the BB-phase signal input from the third element array 73 is shifted by +P/2×θ. The phase of the AB-phase signal input from the fourth element array 74 is shifted by +3 P/2×θ.

Under this condition, for the signal input unit 6a (see FIG. 3), which outputs the difference A-phase signal, the A-phase signal with the phase shifted by −3 P/2×θ is input from the first element array 71 into the positive phase signal input unit 61a (see FIG. 3), and the AB-phase signal with the phase shifted by +3 P/2×θ is input from the fourth element array 74 into the negative phase signal input unit 62a. Then, the calculation of the equation (7) is performed in the course of transformation into the difference A-phase signal, and the phase shift between the A-phase signal and the AB-phase signal is canceled out and the phase shift in the difference A-phase signal therefore becomes zero.

Further, for the signal input unit 6b (see FIG. 3), which outputs the difference B-phase signal, the B-phase signal with the phase shifted by −P/2×θ is input from the second element array 72 into the positive phase signal input unit 61b (see FIG. 3), and the BB-phase signal with the phase shifted by +P/2×θ is input from the third element array 73 into the negative phase signal input unit 62b. Then, the calculation of the equation (8) is performed in the course of transformation into the difference B-phase signal, and the phase shift between the B-phase signal and the BB-phase signal is canceled out and the phase shift in the difference B-phase signal therefore becomes zero.

Both the phase shift in the difference A-phase signal and the phase shift in the difference B-phase signal become zero and are therefore the same. Accordingly, the phase difference between the difference A-phase signal and the difference B-phase signal remains unchanged between the case where the scale 2 is at a tilt angle θ=0 and the case where the scale 2 is at a tilt angle θ≠0, and the interference fringes generated in the light-receiving surface 50 are also approximate to the interference fringes generated when the scale 2 is at a tilt angle θ=0.

Accordingly, as shown in FIG. 5, although the output voltage of the difference A-phase signal and the difference B-phase signal output from the two signal input units 6a, 6b (see FIG. 3) is reduced as compared to the case where the scale 2 (see FIG. 1) is at a tilt angle θ=0, the difference A-phase signal and the difference B-phase signal are output to the calculation means 8, with the phase difference when the tilt angle is θ=0 (i.e., the phase difference of 90 degrees) being maintained.

Figure 14:
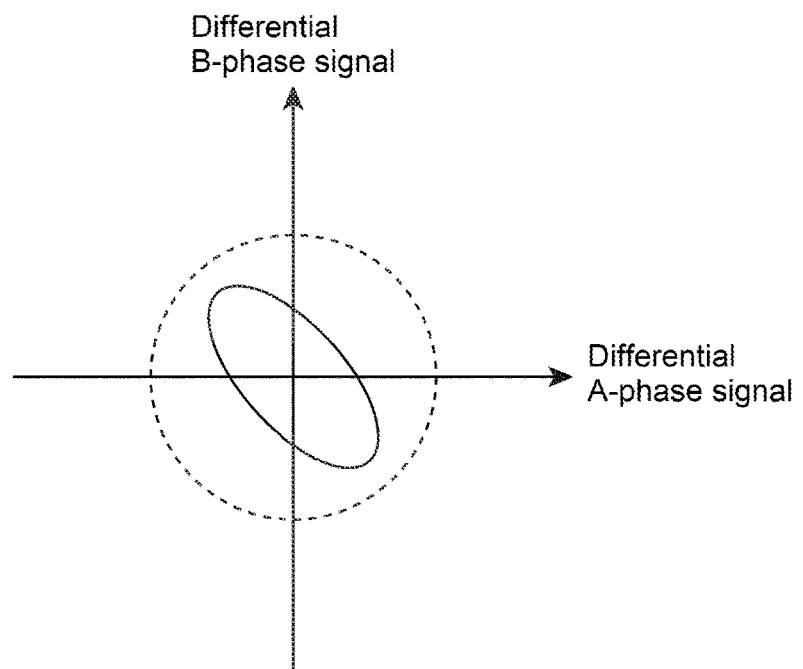
FIG. 14 a graph showing Lissajous signals calculated from the differential signals based on the two phases in the conventional encoder.

Further, as shown in FIG. 6, although the Lissajous signals calculated at the calculation means 8 based on the difference A-phase signal and the difference B-phase signal output from the two signal input units 6a, 6b become oval Lissajous signals, the amplitude of which being reduced and their oblateness being higher as compared to the case where the scale 2 is disposed at a tilt angle θ=0, the Lissajous signals close to a true circle are obtained as compared to the Lissajous signals in the conventional encoder 100 shown in FIG. 14.

The encoder 1 can therefore suppress the accuracy deterioration even if the scale 2 is disposed in a tilted manner with respect to the light-receiving unit 5 by being rotated around an axis (i.e., a rotation axis) orthogonal to the light-receiving surface 50.

According to such first embodiment, the following effects can be achieved:

(1) the plurality of element arrays 71-74 in the element array group 7 are disposed at positions where the sum of (i) the distance in the orthogonal direction (+Y direction) from the reference position to a positive phase signal element array (the first element array 71 or the second element array 72), and (ii) the distance in the orthogonal direction (−Y direction) from the reference position to a negative phase signal element array (the third element array 73 or the fourth element array 74), is the same for the difference A-phase signal and the difference B-phase signal. This enables the shift in the phase difference between the differential signals caused by the scale 2 being disposed in a tilted manner with respect to the light-receiving unit 5 by being rotated around an axis (i.e., a rotation axis) orthogonal to the light-receiving surface 50 to be canceled out. Accordingly, the encoder 1 can suppress the accuracy deterioration even if the scale 2 is disposed in a tilted manner with respect to the light-receiving unit 5 by being rotated around the axis (i.e., the rotation axis) orthogonal to the light-receiving surface 50;

(2) the positive phase signal element arrays (the first element array 71 and the second element array 72) are disposed on the +Y side in the light-receiving surface 50 with respect to the center line at the center of the element arrays provided in a parallel manner in the Y direction and the negative phase signal element arrays (the third element array 73 and the fourth element array 74) are disposed on the −Y side in the light-receiving surface 50 with respect to the center line. This enables the design to be simplified as well as enabling the reduction in amplitude of the differential signals to be suppressed; and (3) a plurality of element array groups 7 are disposed along the Y direction in the light-receiving surface 50. This enables the light distribution of the light radiated onto the light-receiving surface 50 via the scale 2 to become uniform.

Second Embodiment

The second embodiment of the present invention will be described hereinafter with reference to FIGS. 7 to 9. In the following description, the same reference numbers will be given to the parts that are already described and the description thereof will be omitted.

Figure 7:
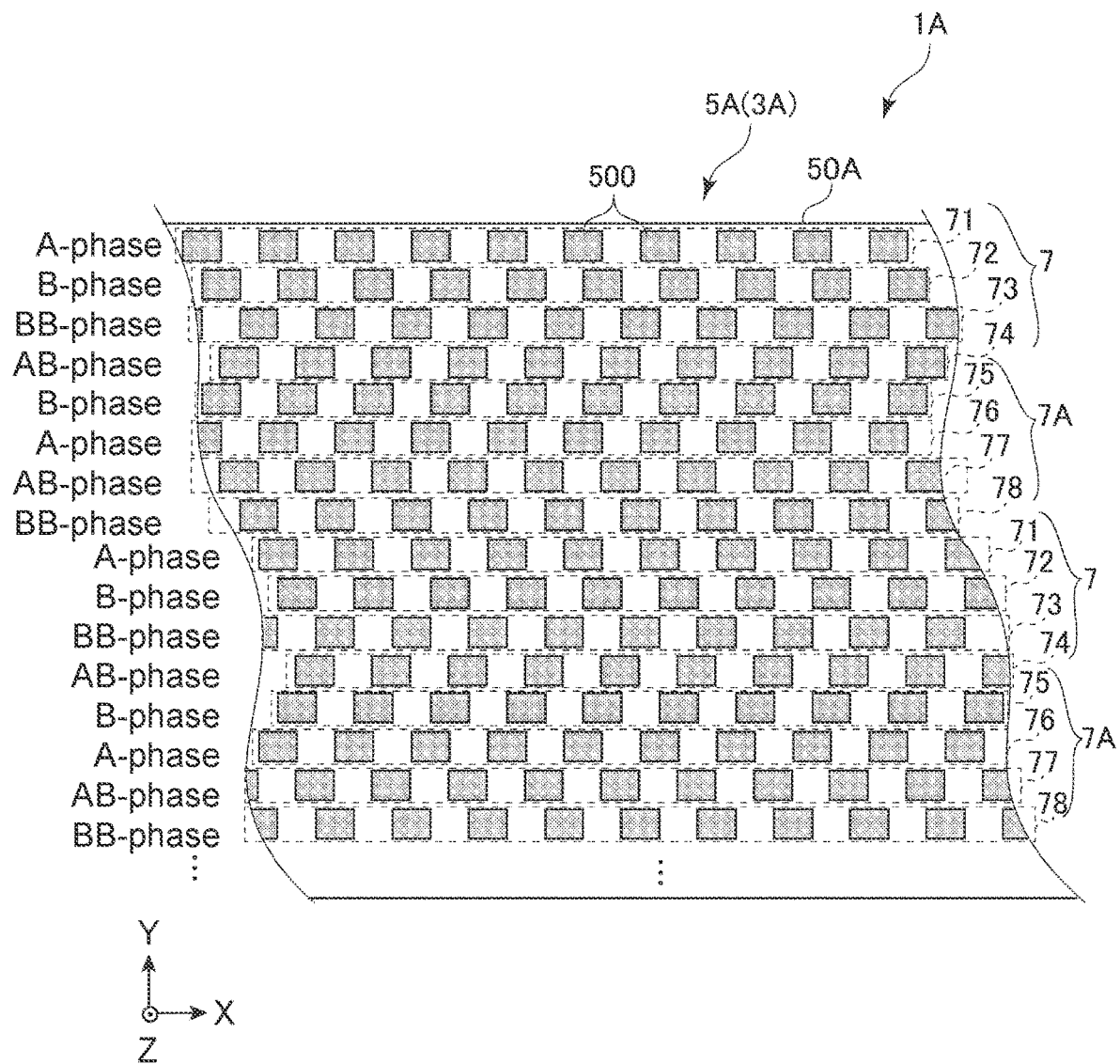
FIG. 7 is a plan view showing a light-receiving unit in an encoder according to a second embodiment.

FIG. 7 is a plan view showing a light-receiving unit 5A in an encoder 1A according to the second embodiment.

In the above-described first embodiment, in an element array group 7, the first element array 71 inputs an A-phase signal into a positive phase signal input unit 61, the second element array 72 inputs a B-phase signal into a positive phase signal input unit 61, the third element array 73 inputs a BB-phase signal into a negative phase signal input unit 62, and the fourth element array 74 inputs an AB-phase signal into a negative phase signal input unit 62.

As shown in FIG. 7, the second embodiment differs from the above-described first embodiment in that the light-receiving surface 50A is provided with a first element array group 7 that is similar to that in the first embodiment and a second element array group 7A that is adjacent to and provided in a parallel manner to the first element array group 7 in the Y direction, which is an orthogonal direction, in the light-receiving surface 50A.

The light-receiving unit 5A will be described in detail hereinafter.

The element array groups include a first element array group 7 and a second element array group 7A that is adjacent to and provided in a parallel manner to the first element array group 7 in the Y direction (orthogonal direction) in the light-receiving surface 50.

The second element array group 7A includes a plurality of element arrays 75-78, i.e., at least four element arrays, and an even number of element arrays, disposed in a different manner from the plurality of element arrays 71-74 in the first element array group 7. The plurality of element arrays 75-78 are provided in a parallel manner along the orthogonal direction (Y direction) orthogonal to the measurement direction.

Now, in the above-described first embodiment, a plurality of element array groups 7 are disposed along the Y direction in the light-receiving surface 50.

The second embodiment differs from the above-described first embodiment in that a first element array group 7 and a second element array group 7A are grouped into a set, and a plurality of sets of element array groups 7, 7A are disposed along the Y direction in the light-receiving surface 50A. More specifically, the first element arrays 7 and the second element arrays 7A are disposed in an alternating and repeated manner along the Y direction in the light-receiving surface 50A.

Figure 8:
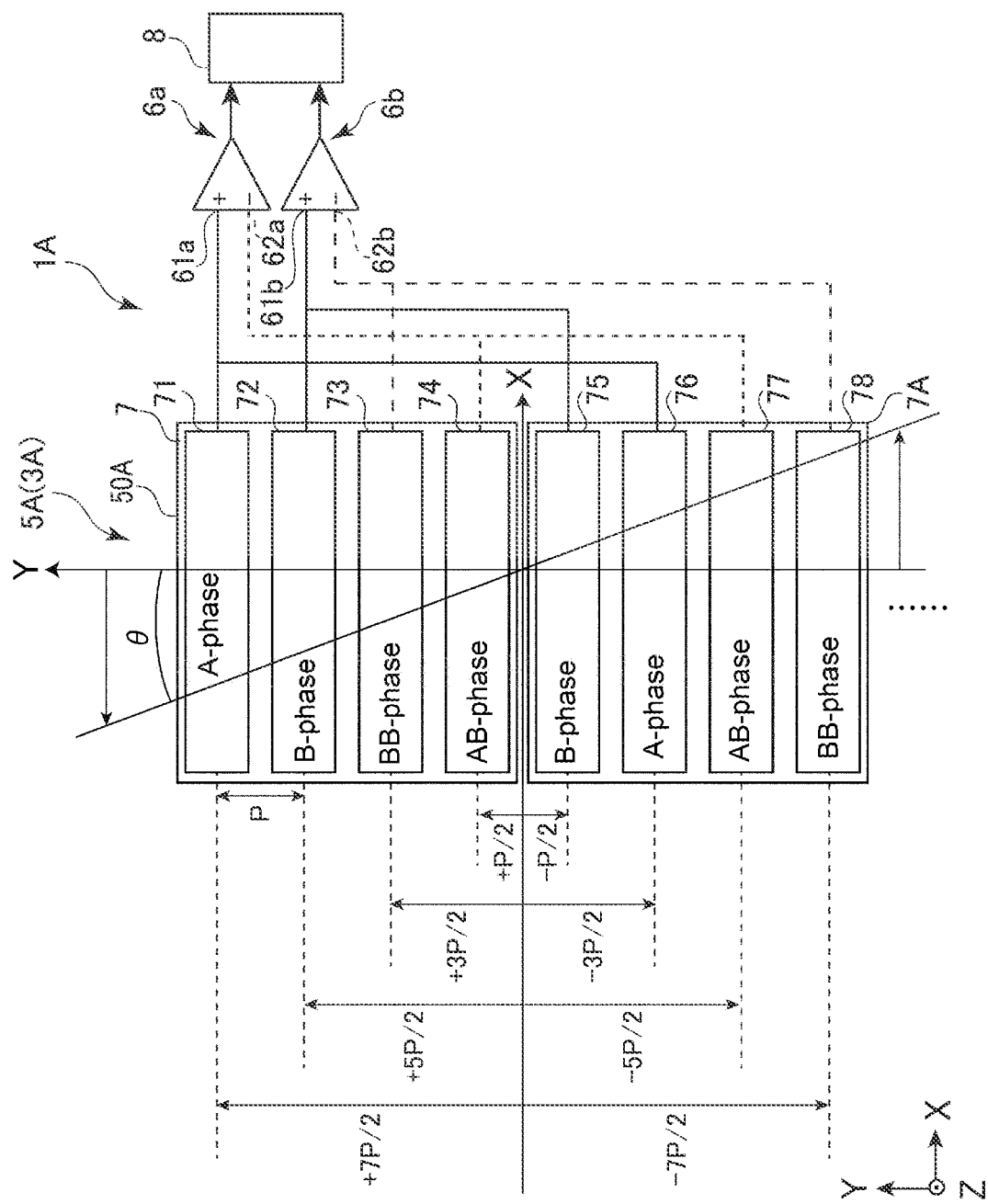
FIG. 8 is a schematic diagram showing the light-receiving unit, signal input units, and a calculation means in the above-described encoder.

FIG. 8 is a schematic diagram showing the light-receiving unit 5A, signal input units 6a, 6b, and a calculation means 8 in the encoder 1A.

As shown in FIG. 8, the second element array group 7A includes a fifth element array 75, a sixth element array 76, a seventh element array 77, and an eighth element array 78, in this order from the +Y side (the top part in the plane of the paper) to the −Y side (the bottom part in the plane of the paper). The plurality of element arrays 75-78 are disposed with a predetermined pitch P along the Y direction.

For each of the two phases, the plurality of element arrays 75-78 include positive phase signal element arrays (the fifth element array 75 and the sixth element array 76) that output positive phase signals, and negative phase signal element arrays (the seventh element array 77 and the eighth element array 78) that output negative phase signals.

Further, the plurality of element arrays 75-78 are disposed in a shifted manner along the X direction with a predetermined phase difference. More specifically, the sixth element array 76 is disposed in a shifted manner along the X direction with a phase difference of 90 degrees relative to the fifth element array 75, the seventh element array 77 is disposed in a shifted manner along the X direction with a phase difference of 270 degrees relative to the fifth element array 75, and the eighth element array 78 is disposed in a shifted manner along the X direction with a phase difference of 180 degrees relative to the fifth element array 75.

The fifth element array 75 outputs a B-phase signal, which is a positive phase signal of the B-phase, the sixth element array 76 outputs an A-phase signal, which is a positive phase signal of the A-phase, the seventh element array 77 outputs an AB-phase signal, which is a negative phase signal of the A-phase, and the eighth element array 78 outputs a BB-phase signal, which is a negative phase signal of the B-phase. Accordingly, the fifth element array 75 and the sixth element array 76 correspond to the positive phase signal element arrays in the present invention, and the seventh element array 77 and the eighth element array 78 correspond to the negative phase signal element arrays in the present invention.

In the first element array group 7, the positive phase signal element arrays (the first element array 71 and the second element array 72) account for half (i.e., two arrays) of the plurality of (i.e., four) element arrays 71-74 in the first element array group 7. The positive phase signal element arrays (the first element array 71 and the second element array 72) are disposed on the +Y side with respect to the center line at the center of the element arrays in the first element array group 7 provided in a parallel manner in the Y direction. In addition, the positive phase signal element arrays (the first element array 71 and the second element array 72) are disposed in the order, which serves as a predetermined reference, from one end (the top part of the first element array group 7 in the plane of the paper) in the Y direction toward the center (the downward direction in the plane of the paper) in the first element array group 7. In the present embodiment, the "order, which serves as a predetermined reference for the positive phase signal element arrays" is defined as the order of an A-phase and then a B-phase.

Further, in the second element array group 7A, the positive phase signal element arrays (the fifth element array 75 and the sixth element array 76) account for half (i.e., two arrays) of the plurality of (i.e., four) element arrays 75-78 in the second element array group 7A. The positive phase signal element arrays (the fifth element array 75 and the sixth element array 76) are disposed on the +Y side with respect to the center line at the center of the element arrays in the second element array group 7A provided in a parallel manner in the Y direction. In addition, the positive phase signal element arrays (the fifth element array 75 and the sixth element array 76) are disposed in the order reverse to the order serving as the predetermined reference from one end (the top part of the second element array group 7A in the plane of the paper) in the Y direction toward the center (the downward direction in the plane of the paper) in the second element array group 7A.

More specifically, since the "order, which serves as a predetermined reference for the positive phase signal element arrays" is defined as the order of an A-phase and then a B-phase, the "order reverse to the order serving as the predetermined reference for the positive phase signal element arrays" is defined as the order of a B-phase and then an A-phase. Accordingly, if the positive phase signal element arrays in the first element array group 7 are disposed in the order of the first element array 71 that outputs an A-phase signal and then the second element array 72 that outputs a B-phase signal, from one end (the top part of the first element array group 7 in the plane of the paper) in the Y direction toward the center (the downward direction in the plane of the paper), the positive phase signal element arrays in the second element array group 7A are disposed in the order of the fifth element array 75 that outputs a B-phase signal and then the sixth element array 76 that outputs an A-phase signal from one end (the top part of the second element array group 7A in the plane of the paper) in the Y direction toward the center (the downward direction in the plane of the paper), and the positive phase signal element arrays are disposed such that the two phases are disposed in orders reverse to each other.

In the first element array group 7, the negative phase signal element arrays (the third element array 73 and the fourth element array 74) account for half (i.e., two arrays) of the plurality of (i.e., four) element arrays 71-74 in the first element array group 7. The negative phase signal element arrays (the third element array 73 and the fourth element array 74) are disposed on the −Y side with respect to the center line at the center of the element arrays in the first element array group 7 provided in a parallel manner in the Y direction. In addition, the negative phase signal element arrays (the third element array 73 and the fourth element array 74) are disposed in the order, which serves as a predetermined reference, from the other end (the bottom part of the first element array group 7 in the plane of the paper) in the Y direction toward the center (the upward direction in the plane of the paper) in the first element array group 7. In the present embodiment, the "order, which serves as a predetermined reference for the negative phase signal element arrays" is defined as the order of an AB-phase and then a BB-phase.

Further, in the second element array group 7A, the negative phase signal element arrays (the seventh element array 77 and the eighth element array 78) account for half (i.e., two arrays) of the plurality of (i.e., four) element arrays 75-78 in the second element array group 7A. The negative phase signal element arrays (the seventh element array 77 and the eighth element array 78) are disposed on the −Y side with respect to the center line at the center of the element arrays in the second element array group 7A provided in a parallel manner in the Y direction. In addition, the negative phase signal element arrays (the seventh element array 77 and the eighth element array 78) are disposed in the order reverse to the order serving as the predetermined reference, from the other end (the bottom part of the second element array group 7A in the plane of the paper) in the Y direction toward the center (the upward direction in the plane of the paper) in the second element array group 7A.

More specifically, since the "order, which serves as a predetermined reference for the negative phase signal element arrays" is defined as the order of an AB-phase and then a BB-phase, the "order reverse to the order serving as the predetermined reference for the negative phase signal element arrays" is defined as the order of a BB-phase and then an AB-phase. Accordingly, if the negative phase signal element arrays in the first element array group 7 are disposed in the order of the fourth element array 74 that outputs an AB-phase signal and then the third element array 73 that outputs a BB-phase signal, from the other end (the bottom part of the first element array group 7 in the plane of the paper) in the Y direction toward the center (the upward direction in the plane of the paper), the negative phase signal element arrays in the second element array group 7A are disposed in the order of the eighth element array 78 that outputs a BB-phase signal and then the seventh element array 77 that outputs an AB-phase signal, from the other end (the bottom part of the second element array group 7A in the plane of the paper) in the Y direction toward the center (the upward direction in the plane of the paper), and the negative phase signal element arrays are disposed such that the two phases are disposed in orders reverse to each other.

Namely, in the first element array group 7, the plurality of element arrays 71-74 are disposed from the +Y side toward the −Y side such that their output detection signals are in the order serving as the predetermined reference, i.e., in the order of an A-phase signal, a B-phase signal, a BB-phase signal, and an AB-phase signal. In the second element array group 7A, the plurality of element arrays 75-78 are disposed from the +Y side toward the −Y side such that their output detection signals are in the order reverse to the order serving as the predetermined reference, i.e., in the order of a B-phase signal, an A-phase signal, an AB-phase signal, and a BB-phase signal.

Regarding the two signal input units 6a, 6b, for the first signal input unit 6a, A-phase signals are input from the first element array 71 and the sixth element array 76 in the light-receiving unit 5 into a positive phase signal input unit 61a, and AB-phase signals are input from the fourth element array 74 and the seventh element array 77 into a negative phase signal input unit 62a. The first signal input unit 6a then outputs a difference A-phase signal, which is the difference between the A-phase signals and the AB-phase signals (i.e., the A-phase signals minus the AB-phase signals) to the calculation means 8.

For the second signal input unit 6b, B-phase signals are input from the second element array 72 and the fifth element array 75 in the light-receiving unit 5 into a positive phase signal input unit 61b, and BB-phase signals are input from the third element array 73 and the eighth element array 78 into a negative phase signal input unit 62b. The second signal input unit 6b then outputs a difference B-phase signal, which is the difference between the B-phase signals and the BB-phase signals (i.e., the B-phase signals minus the BB-phase signals) to the calculation means 8.

The plurality of element arrays 71-78 in the first element array group 7 and the second element array 7A are disposed at positions where the sum of: (i) the distance in the Y direction from a reference position to a positive phase signal element array (the first element array 71, the second element array 72, the fifth element array 75, or the sixth element array 76); and (ii) the distance in the Y direction from the reference position to a negative phase signal element array (the third element array 73, the fourth element array 74, the seventh element array 77, or the eighth element array 78), is the same for all the phases of the two phases (i.e., the A-phase and the B-phase).

The first element array 71 is located at a distance of +7 P/2 from the reference position in the +Y direction, the second element array 72 is located at a distance of +5 P/2 from the reference position in the +Y direction, the third element array 73 is located at a distance of +3 P/2 from the reference position in the +Y direction, the fourth element array 74 is located at a distance of +P/2 from the reference position in the +Y direction, the fifth element array 75 is located at a distance of −P/2 from the reference position in the −Y direction, the sixth element array 76 is located at a distance of −3 P/2 from the reference position in the −Y direction, the seventh element array 77 is located at a distance of −5 P/2 from reference position in the −Y direction, and the eighth element array 78 is located at a distance of −7 P/2 from the reference position in the −Y direction.

In the encoder 1A, the sum of the distances between: (i) the first element array 71, which outputs an A-phase signal, and the reference position; (ii) the sixth element array 76, which outputs an A-phase signal, and the reference position; (iii) the fourth element array 74, which outputs an AB-phase signal, and the reference position; and (iv) the seventh element array 77, which outputs an AB-phase signal, and the reference position, is expressed as in the following equation (9). The A-phase signals and the AB-phase signals serve as inputs for generating the difference A-phase signal. The sum of the distances between: (i) the second element array 72, which outputs a B-phase signal, and the reference position; (ii) the fifth element array 75, which outputs a B-phase signal, and the reference position; (iii) the third element array 73, which outputs a BB-phase signal, and the reference position; and (iv) the eighth element array 78, which outputs a BB-phase signal, and the reference position, is expressed as in the following equation (10). The B-phase signals and the BB-phase signals serve as inputs for generating the difference B-phase signal.

$$(+7P/2)+(-3P/2)+(+P/2)+(-5P/2)=0 \quad (9)$$

$$(+5P/2)+(-P/2)+(+3P/2)+(-7P/2)=0 \quad (10)$$

As indicated by the equations (9) and (10), in the encoder 1A, the element arrays are disposed at positions where the sum of: (i) the distance in the Y direction from the reference position to a positive phase signal element array (the first element array 71, the second element array 72, the fifth element array 75, or the sixth element array 76); and (ii) the distance in the Y direction from the reference position to a negative phase signal element array (the third element array 73, the fourth element array 74, the seventh element array 77, or the eighth element array 78), is the same for the difference A-phase signal and the difference B-phase signal. Such disposition of the plurality of element arrays 71-78 allows the following effects to be obtained if the scale 2 (see FIG. 1) is disposed in a tilted manner at a tilt angle $\theta \neq 0$ with respect to the light-receiving unit 5A, in particular, with respect to the direction (Y direction) orthogonal to the measurement direction (X direction), by being rotated around an axis (i.e., a rotation axis) orthogonal to the light-receiving surface 50A.

In the encoder 1A, even if the scale 2 (see FIG. 1) is disposed in a tilted manner at a tilt angle $\theta$, the amount of shift in the two differential signals resulting from the tilt angle $\theta$ of the scale 2 is canceled out as indicated by equation (11) relating to the difference A-phase signal and equation (12) relating to the difference B-phase signal.

$$(-7P/2\times\theta)+(-P/2\times\theta)+(3P/2\times\theta)+(5P/2\times\theta)=0 \quad (11)$$

$$(-5P/2\times\theta)+(-3P/2\times\theta)+(P/2\times\theta)+(7P/2\times\theta)=0 \quad (12)$$

Figure 9:
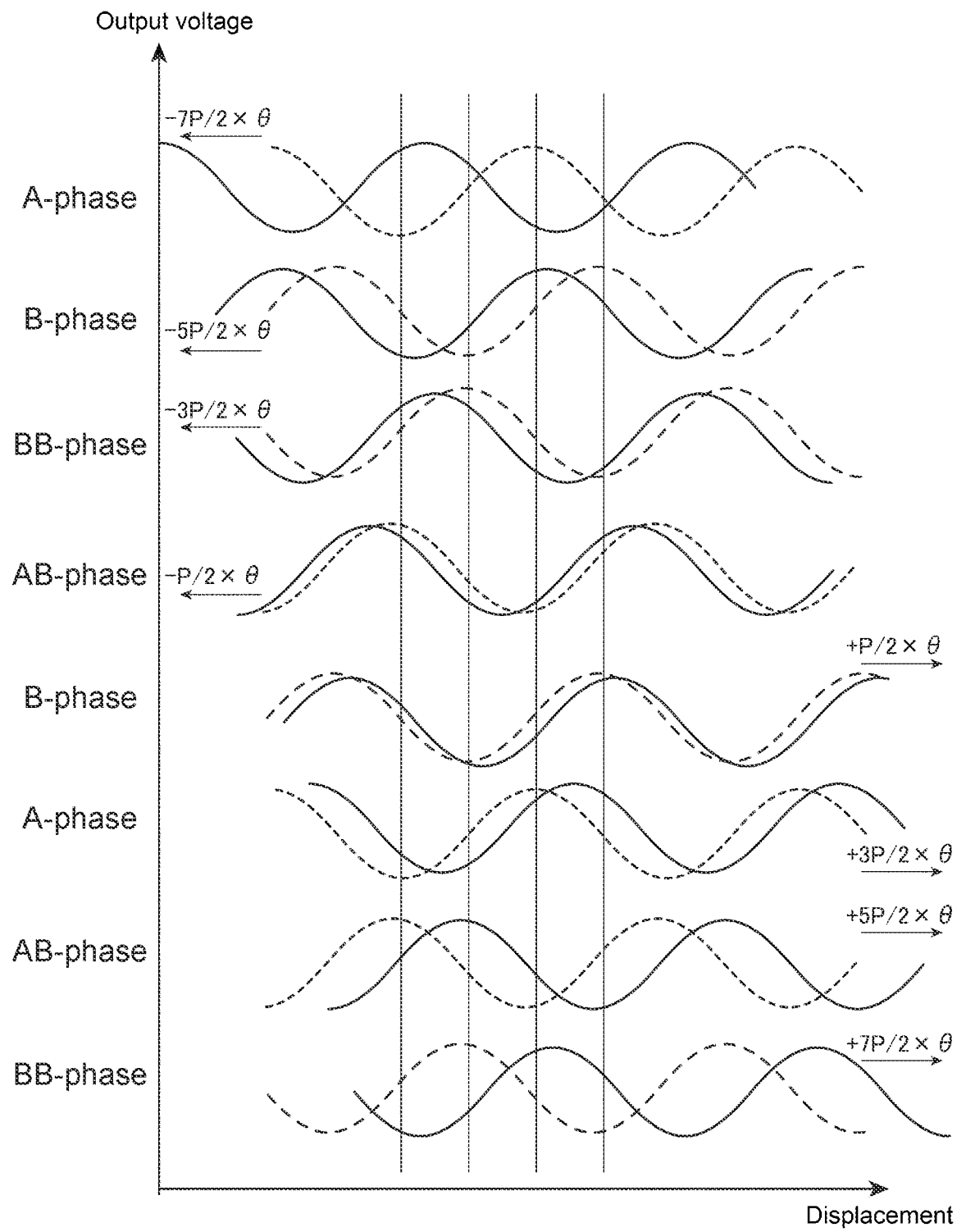
FIG. 9 is a graph showing variations of detection signals in the above-described encoder.

FIG. 9 is a graph showing variations of the detection signals in the encoder 1A. More specifically, in FIG. 9, the vertical axis represents the output voltage, and the horizontal axis represents the displacement. In FIG. 9, the graph when the scale 2 (see FIG. 1) is disposed at a tilt angle $\theta \neq 0$ with respect to the light-receiving unit 5A is indicated with solid lines and the graph when the scale 2 is disposed at a tilt angle $\theta = 0$ with respect to the light-receiving unit 5A is indicated with dashed lines.

Hereinafter, the variations of the detection signals output from the light-receiving unit 5A to the signal input units 6a, 6b and the variations of the difference A-phase signal and the difference B-phase signal output from the signal input units 6a, 6b to the calculation means 8 will be described.

As shown in FIG. 9, if the scale 2 (see FIG. 1) is disposed at a tilt angle $\theta \neq 0$ with respect to the light-receiving unit 5A, the phase of the A-phase signal input from the first element array 71 is shifted by $-7$ P/2×$\theta$ as compared to that of the case where the scale 2 is disposed at a tilt angle $\theta=0$. The phase of the B-phase signal input from the second element array 72 is shifted by $-5$ P/2×$\theta$. The phase of the BB-phase signal input from the third element array 73 is shifted by $-3$ P/2×$\theta$. The phase of the AB-phase signal input from the fourth element array 74 is shifted by $-P/2\times\theta$. The phase of the B-phase signal input from the fifth element array 75 is shifted by $+P/2\times\theta$. The phase of the A-phase signal input from the sixth element array 76 is shifted by $+3$ P/2×$\theta$. The phase of the AB-phase signal input from the seventh element array 77 is shifted by $+5$ P/2×$\theta$. The phase of the BB-phase signal input from the eighth element array 78 is shifted by $+7$ P/2×$\theta$.

Under this condition, for the signal input unit 6a (see FIG. 8), which outputs the difference A-phase signal, the A-phase signal with the phase shifted by $-7$ P/2×$\theta$ is input from the first element array 71 into the positive phase signal input unit 61a (see FIG. 8) and the A-phase signal with the phase shifted by $+3$ P/2×$\theta$ is input from the sixth element array 76 into the positive phase signal input unit 61a, and the AB-phase signal with the phase shifted by $-P/2\times\theta$ is input from the fourth element array 74 into the negative phase signal input unit 62a and the AB-phase signal with the phase shifted by $+5$ P/2×$\theta$ is input from the seventh element array 77 into the negative phase signal input unit 62a. Then, the calculation of the equation (11) is performed in the course of transformation into the difference A-phase signal, and the phase shift between the A-phase signal and the AB-phase signal is canceled out and the phase shift in the difference A-phase signal therefore becomes zero.

Further, for the signal input unit 6b (see FIG. 8), which outputs the difference B-phase signal, the B-phase signal with the phase shifted by $-5$ P/2×$\theta$ is input from the second element array 72 into the positive phase signal input unit 61b (see FIG. 8) and the B-phase signal with the phase shifted by $+P/2\times\theta$ is input from the fifth element array 75 into the positive phase signal input unit 61b, and the BB-phase signal with the phase shifted by $-3$ P/2×$\theta$ is input from the third element array 73 into the negative phase signal input unit 62b and the BB-phase signal with the phase shifted by $+7$ P/2×$\theta$ is input from the eighth element array 78 into the negative phase signal input unit 62b. Then, the calculation of the equation (12) is performed in the course of transformation into the difference B-phase signal, and the phase shift between the B-phase signal and the BB-phase signal is canceled out and the phase shift in the difference B-phase signal therefore becomes zero.

Both the phase shift in the difference A-phase signal and the phase shift in the difference B-phase signal become zero and are therefore the same. Accordingly, the phase difference between the difference A-phase signal and the difference B-phase signal remains unchanged between the case where the scale 2 is at a tilt angle $\theta=0$ and the case where the scale 2 is at a tilt angle $\theta \neq 0$, and the interference fringes generated in the light-receiving surface 50A are also approximate to the interference fringes generated when the scale 2 is at a tilt angle $\theta=0$.

Accordingly, as shown in FIG. 5, although the output voltage of the difference A-phase signal and the difference B-phase signal output from the two signal input units 6a, 6b (see FIG. 38) is reduced as compared to the case where the scale 2 (see FIG. 1) is at a tilt angle $\theta=0$, the difference A-phase signal and the difference B-phase signal are output to the calculation means 8, with the phase difference when the tilt angle is $\theta=0$ (i.e., the phase difference of 90 degrees) being maintained.

Further, as shown in FIG. 6, although the Lissajous signals calculated at the calculation means 8 based on the difference A-phase signal and the difference B-phase signal output from the two signal input units 6a, 6b become oval Lissajous signals, the amplitude of which being reduced and their oblateness being higher as compared to the case where the scale 2 is disposed at a tilt angle $\theta=0$, the Lissajous signals close to a true circle are obtained as compared to the Lissajous signals in the conventional encoder 100 shown in FIG. 14. It should be noted that the Lissajous signals in the encoder 1A of the second embodiment are closer to a true circle than the Lissajous signals in the encoder 1 of the first embodiment.

The encoder 1A can therefore suppress the accuracy deterioration even if the scale 2 is disposed in a tilted manner with respect to the light-receiving unit 5A by being rotated around an axis (i.e., a rotation axis) orthogonal to the light-receiving surface 50A.

In the second embodiment, the following effect can be achieved in addition to effects (1) to (3) of the above-described first embodiment:

(4) while suppressing the reduction in amplitude of the differential signals, which are based on the detection signals from the light-receiving unit 5A, the shift in the phase difference between the differential signals caused by the scale 2 being disposed in a tilted manner with respect to the light-receiving unit 5A by being rotated around an axis (i.e., a rotation axis) orthogonal to the light-receiving surface 50A can be canceled out more efficiently than the case where the first element array group 7 and the second element array group 7A are not provided.

Variation of Embodiments

It should be noted that the present invention is not limited to the above-described respective embodiments, and variations, modifications and the like are included in the present invention to the extent that such variations, modifications and the like can achieve the object of the present invention.

For example, in the above-described respective embodiments, which are described are cases where the present invention is applied to the encoders 1, 1A, which are linear encoders; however, any encoder may be used without particular regard to the type of the detector, the detection method and/or the like.

More specifically, in the above-described respective embodiments, the optical encoders 1, 1A are used in which the detection head 3, 3A is provided with: a light source 4, serving as a transmitting unit, that radiates light, serving as measurement signals, toward the scale 2; and a light-receiving unit 5, 5A, serving as a receiving unit, that includes the light-receiving surface 50, 50A, serving as a receiving surface, that receives the light from the light source 4 via the scale 2, and the light-receiving surface 50, 50A is provided with an element array including a plurality of light-receiving elements 500, serving as receiving elements. Instead of an optical type, the encoder may be of other detection types, such as a capacitive type or an inductive type. In such case, the transmitting unit transmitting the measurement signals, the receiving unit including the receiving surface, the plurality of receiving elements, and the like, may be any unit/element having similar functions in an encoder of the capacitive type, the inductive type, and/or the like. For example, in an inductive type encoder, the transmitting unit may transmit a magnetic force corresponding to the measurement signals for exciting coils corresponding to the graduations, and the receiving unit may include a plurality of receiving coils corresponding to the plurality of receiving elements and receive the changes in magnetic flux of the coils.

In the above-described respective embodiments, there is no component, such as an optical member, that is disposed between the scale and the light-receiving unit; however, members configured as described below may be disposed.

Namely, the encoder is preferably provided with a plate-like grid plate having a plurality of grids formed along the measurement direction with a period corresponding to that of the graduations. The grid plate is preferably disposed between the scale and the light-receiving unit. The light-receiving unit preferably receives light that has passed through the grid plate.

For example, even if light-receiving elements with a size larger than a desired size can only be used, the above-described configuration enables interference fringes almost similar to those generated by the light-receiving elements with the desired size to be generated by disposing the grid plate over the light-receiving elements.

In the above-described second embodiment, the first element array group 7 and the second element array group 7A are grouped into a set, and the first element arrays 7 and the second element arrays 7A are disposed in an alternating and repeated manner along the Y direction in the light-receiving surface 50A. However, a plurality of sets of element array groups 7, 7A may not need to be disposed along the Y direction in the light-receiving surface 50A. For example, instead of disposing the first element array groups 7 and the second element array groups 7A in an alternating and repeated manner, a plurality of element array groups may be disposed in any combination along the Y direction in the light-receiving surface 50A. In short, it is sufficient if a plurality of element array groups are disposed along an orthogonal direction in the receiving surface.

In the above-described first embodiment, the first element array 71 outputs an A-phase signal, which is a positive phase signal, the second element array 72 outputs a B-phase signal, which is a positive phase signal, the third element array 73 outputs a BB-phase signal, which is a negative phase signal, and the fourth element array 74 outputs an AB-phase signal, which is a negative phase signal. However, the first element array may output an A-phase signal, which is a positive phase signal, the second element array may output a BB-phase signal, which is a negative phase signal, the third element array may output a B-phase signal, which is a positive phase signal, and the fourth element array may output an AB-phase signal, which is a negative phase signal.

Further, in the above-described second embodiment, in the first element array group 7, the first element array 71 outputs an A-phase signal, which is a positive phase signal, the second element array 72 outputs a B-phase signal, which is a positive phase signal, the third element array 73 outputs a BB-phase signal, which is a negative phase signal, and the fourth element array 74 outputs an AB-phase signal, which is a negative phase signal. In addition, in the second element array group 7A, the fifth element array 75 outputs a B-phase signal, which is a positive phase signal, the sixth element array 76 outputs an A-phase signal, which is a positive phase signal, the seventh element array 77 outputs an AB-phase signal, which is a negative phase signal, and the eighth element array 78 outputs a BB-phase signal, which is a negative phase signal.

However, in the second element array group, the plurality of element arrays may output detection signals in any other combination. In short, it is sufficient if the at least two signal input units receive detection signals, as inputs, from the element arrays that are disposed at positions where the sum of: (i) the phase difference of element arrays that input positive phase signals into the positive phase signal input unit; and (ii) the phase difference of element arrays that input negative phase signals into the negative phase signal input unit, is the same at the respective signal input units.

In the above-described respective embodiments, the X-axis is defined as the reference position; however, the reference position may be any position, as long as it is a predetermined position on the light-receiving surface. For example, in the case where the reference position is defined to be the first element array 71 for the plurality of element arrays 71-74 of the first embodiment shown in FIG. 3:

the second element array 72 will be located at a distance of −P in the −Y direction from the reference position (i.e., the first element array 71), the third element array 73 will be located at a distance of −2 P in the −Y direction from the reference position, and the fourth element array 74 will be located at a distance of −3 P in the −Y direction from the reference position.

The sum of the distances between: (i) the first element array 71, which outputs the A-phase signal, and the reference position; and (ii) the fourth element array 74, which outputs the AB-phase signal, and the reference position, will be then expressed as in the following equation (13). The A-phase signal and the AB-phase signal serve as inputs for generating the difference A-phase signal. Further, the sum of the distances between: (i) the second element array 72, which outputs the B-phase signal, and the reference position; and (ii) the third element array 73, which outputs the BB-phase signal, and the reference position, will be expressed as in the following equation (14). The B-phase signal and the BB-phase signal serve as inputs for generating the difference B-phase signal.

$$0+(-3P)=-3P \quad (13)$$

$$(-P)+(-2P)=-3P \quad (14)$$

As indicated by the equations (13) and (14), the element arrays are disposed at positions where the sum of: (i) the distance in the Y direction from the reference position (the first element array 71) to a positive phase signal element array (the first element array 71 or the second element array 72); and (ii) the distance in the Y direction from the reference position to a negative phase signal element array (the third element array 73 or the fourth element array 74), is the same for the difference A-phase signal and the difference B-phase signal. Accordingly, any position may be defined as the reference position as long as it is a predetermined position on the light-receiving surface. In short, it is sufficient if the plurality of element arrays in the element array group are disposed at positions where the sum of: (i) the distance in an orthogonal direction from the reference position to a positive phase signal element array; and (ii) the distance in the orthogonal direction from the reference position to a negative phase signal element array, is the same for all the phases of the at least two phases (i.e., the A-phase and the B-phase).

In the above-described respective embodiments, the encoder 1, 1A outputs the difference A-phase signal and the difference B-phase signal as differential signals with two phases; however, differential signals with a plurality of phases may be output as long as they are differential signals with at least two phases. In the above-described respective embodiments, the first element array group 7 and the second element array group 7A each includes four element arrays; however, it may include six arrays or eight arrays.

For example, if an encoder outputs differential signals with three phases (an A-phase, a B-phase, and a C-phase), the first element array group and the second element array group each includes six element arrays, and such element arrays may be disposed as follows. For example, in the first embodiment, the six element arrays in the element array group may be disposed along an orthogonal direction orthogonal to the measurement direction such that they output detection signals in the order of an A-phase signal, a B-phase signal, a C-phase signal, a CB-phase signal, a BB-phase signal, and an AB-phase signal. For example, in the second embodiment, the six element arrays in the first element array group may be disposed from one side toward the other side in an orthogonal direction orthogonal to the measurement direction such that they output detection signals in the order of an A-phase signal, a B-phase signal, a C-phase signal, a CB-phase signal, a BB-phase signal, and an AB-phase signal, with such order serving as a predetermined reference. The six element arrays in the second element array group may be disposed from one side toward the other side in the orthogonal direction orthogonal to the measurement direction such that they output detection signals in the order reverse to the predetermined reference, namely, in the order of a C-phase signal, a B-phase signal, an A-phase signal, an AB-phase signal, a BB-phase signal, and a CB-phase signal.

In the above-described respective embodiments, two signal input units 6a, 6b are described; however, the number of the signal input units may be increased or decreased depending on the number of element arrays and/or the number of signals to be acquired, or the signal input unit may even not need to be provided. In addition, the above-described respective embodiments are provided with the calculation means 8; however, the calculation means may not need to be provided if, for example, the encoder is connected to external equipment and the calculation is made in such external equipment.

INDUSTRIAL APPLICABILITY

As described above, the present invention can be suitably utilized in encoders.

The invention claimed is:
1. An encoder comprising: a scale having graduations formed with a predetermined period along a measurement direction; and a detection head provided movably relative to the scale along the measurement direction,
wherein the detection head includes:
a transmitting unit that transmits measurement signals toward the scale; and
a receiving unit that includes a receiving surface that receives the measurement signals from the transmitting unit via the scale, the receiving unit converting the measurement signals received at the receiving surface into differential detection signals with at least two different phases and outputting the detection signals, the detection signals varying correspondingly to the period of the graduations in response to the relative movement between the scale and the detection head,
wherein the receiving surface includes:
an element array group including a plurality of element arrays provided in a parallel manner along an orthogonal direction orthogonal to the measurement direction, the plurality of element arrays including at least four element arrays, with each element array including a plurality of receiving elements disposed along the measurement direction with a period corresponding to that of the graduations,
wherein the plurality of element arrays includes, for each of the at least two phases:
a positive phase signal element array that outputs a positive phase signal; and
a negative phase signal element array that outputs a negative phase signal,
wherein the at least two phases are disposed in a shifted manner with a predetermined phase difference along the measurement direction, wherein the plurality of element arrays in the element array group are disposed at positions where the sum of:
(i) a distance in the orthogonal direction from a reference position to the positive phase signal element array; and (ii) a distance in the orthogonal direction from the reference position to the negative phase signal element array, is the same for all the phases of the at least two phases, wherein the positive phase signal element arrays account for half of the plurality of element arrays in the element array group and are disposed on one side of the receiving surface with respect to the center line, which runs in the measurement direction at the center of the plurality of element arrays provided in a parallel manner in the orthogonal direction, and the negative phase signal element arrays account for half of the plurality of element arrays in the element array group and are disposed on the other side of the receiving surface with respect to the center line, which runs in the measurement direction at the center of the plurality of element arrays provided in a parallel manner in the orthogonal direction.

2. An encoder comprising: a scale having graduations formed with a predetermined period along a measurement direction; and a detection head provided movably relative to the scale along the measurement direction, wherein the detection head includes:

a transmitting unit that transmits measurement signals toward the scale; and a receiving unit that includes a receiving surface that receives the measurement signals from the transmitting unit via the scale, the receiving unit converting the measurement signals received at the receiving surface into differential detection signals with at least two different phases and outputting the detection signals, the detection signals varying correspondingly to the period of the graduations in response to the relative movement between the scale and the detection head, wherein the receiving surface includes:

an element array group including a plurality of element arrays provided in a parallel manner along an orthogonal direction orthogonal to the measurement direction, the plurality of element arrays including at least four element arrays, with each element array including a plurality of receiving elements disposed along the measurement direction with a period corresponding to that of the graduations, wherein the plurality of element arrays includes, for each of the at least two phases;

a positive phase signal element array that outputs a positive phase signal; and a negative phase signal element array that outputs a negative phase signal, wherein the at least two phases are disposed in a shifted manner with a predetermined phase difference along the measurement direction, wherein the plurality of element arrays in the element array group are disposed at positions where the sum of:
(i) a distance in the orthogonal direction from a reference position to the positive phase signal element array; and (ii) a distance in the orthogonal direction from the reference position to the negative phase signal element array, is the same for all the phases of the at least two phases, wherein the element array group includes:

a first element array group; and a second element array group, the second element array group being adjacent to and provided in a parallel manner to the first element array group in the orthogonal direction in the receiving surface, the second element array group including the plurality of element arrays that are disposed differently from the plurality of element arrays in the first element array group, wherein the positive phase signal element arrays in the first element array group account for half of the plurality of element arrays in the first element array group, are disposed on one side with respect to the center line, which runs in the measurement direction at the center of the plurality of element arrays provided in a parallel manner in the orthogonal direction in the first element array group, and are disposed in the order serving as a predetermined reference from one end in the orthogonal direction toward the center in the first element array group, wherein the negative phase signal element arrays in the first element array group account for half of the plurality of element arrays in the first element array group, are disposed on the other side with respect to the center line, which runs in the measurement direction at the center of the plurality of element arrays provided in a parallel manner in the orthogonal direction in the first element array group, and are disposed in the order serving as a predetermined reference from the other end in the orthogonal direction toward the center in the first element array group, wherein the positive phase signal element arrays in the second element array group account for half of the plurality of element arrays in the second element array group, are disposed on one side with respect to the center line, which runs in the measurement direction at the center of the plurality of element arrays provided in a parallel manner in the orthogonal direction in the second element array group, and are disposed in the order reverse to the order serving as the predetermined reference from one end in the orthogonal direction toward the center in the second element array group, and wherein the negative phase signal element arrays of the second element array group account for half of the plurality of element arrays in the second element array group, are disposed on the other side with respect to the center line, which runs in the measurement direction at the center of the plurality of element arrays provided in a parallel manner in the orthogonal direction in the second element array group, and are disposed in the order reverse to the order serving as the predetermined reference from the other end in the orthogonal direction toward the center line in the second element array group.

3. The encoder according to claim 1,
wherein a plurality of the element array groups are disposed along the orthogonal direction in the receiving surface.

4. The encoder according to claim 1,
wherein the encoder is an optical encoder,
wherein the detection head includes:
a light source serving as a transmitting unit that radiates light serving as measurement signals toward the scale; and
a light-receiving unit serving as a receiving unit that includes a light-receiving surface serving as a receiving surface that receives the light from the light source via the scale, the light-receiving unit converting the light received at the light-receiving surface into differential detection signals with at least two different phases and outputting the detection signals, the detection signals varying correspondingly to the period of the graduations in response to the relative movement between the scale and the detection head, and wherein the light-receiving surface includes:

an element array group including a plurality of element arrays provided in a parallel manner along an orthogonal direction orthogonal to the measurement direction, the plurality of element arrays including at least four element arrays, with each element array including a plurality of light-receiving elements serving as receiving elements disposed along the measurement direction with a period corresponding to that of the graduations.

5. The encoder according to claim 4, further comprising a grid plate having a plurality of grids formed along the measurement direction with a period corresponding to that of the graduations, wherein the grid plate is disposed between the scale and the light-receiving unit, and wherein the light-receiving unit receives light that has passed through the grid plate.

6. An optical encoder comprising: a scale having graduations formed with a predetermined period along a measurement direction; a detection head provided movably relative to the scale along the measurement direction; and a grid plate having a plurality of grids formed along the measurement direction with a period corresponding to that of the graduations, wherein the detection head includes:

a light source that radiates light serving as measurement signals toward the scale; and a light-receiving unit that includes a light-receiving surface that receives the light from the light source via the scale, the light-receiving unit converting the light received at the light-receiving surface into differential detection signals with at least two different phases and outputting the detection signals, the detection signals varying correspondingly to the period of the graduations in response to the relative movement between the scale and the detection head, and wherein the light-receiving surface includes:

an element array group including a plurality of element arrays provided in a parallel manner along an orthogonal direction orthogonal to the measurement direction, the plurality of element arrays including at least four element arrays, with each element array including a plurality of light-receiving elements disposed along the measurement direction with a period corresponding to that of the graduations, wherein a plurality of the element array groups are disposed along the orthogonal direction in the light-receiving surface, wherein the plurality of element arrays includes, for each of the at least two phases:

a positive phase signal element array that outputs a positive phase signal; and a negative phase signal element array that outputs a negative phase signal, wherein the at least two phases are disposed in a shifted manner with a predetermined phase difference along the measurement direction, and wherein the plurality of element arrays in the element array group are disposed at positions where the sum of: (i) a distance in the orthogonal direction from a reference position to the positive phase signal element array; and (ii) a distance in the orthogonal direction from the reference position to the negative phase signal element array, is the same for all the phases of the at least two phases, wherein the grid plate is disposed between the scale and the light-receiving unit, wherein the light-receiving unit receives light that has passed through the grid plate, wherein the positive phase signal element arrays account for half of the plurality of element arrays in the element array group and are disposed on one side of the receiving surface with respect to the center line, which runs in the measurement direction at the center of the plurality of element arrays provided in a parallel manner in the orthogonal direction, and the negative phase signal element arrays account for half of the plurality of element arrays in the element array group and are disposed on the other side of the receiving surface with respect to the center line, which runs in the measurement direction at the center of the plurality of element arrays provided in a parallel manner in the orthogonal direction.

* * * * *